(12) United States Patent
Volmering et al.

(10) Patent No.: US 10,406,483 B2
(45) Date of Patent: Sep. 10, 2019

(54) MEMBRANE FILTER AND FILTERING METHOD

(71) Applicant: MEMBION GMBH, Roetgen (DE)

(72) Inventors: Dirk Volmering, Aachen (DE); Klaus Vossenkaul, Aachen (DE)

(73) Assignee: MEMBION GMBH, Roetgen (DE)

( * ) Notice: Subject to any disclaimer, the term of this patent is extended or adjusted under 35 U.S.C. 154(b) by 237 days.

(21) Appl. No.: 15/063,920

(22) Filed: Mar. 8, 2016

(65) Prior Publication Data
US 2016/0207004 A1   Jul. 21, 2016

Related U.S. Application Data

(63) Continuation of application No. PCT/EP2014/068068, filed on Aug. 26, 2014.

(30) Foreign Application Priority Data

Sep. 11, 2013 (DE) .................. 10 2013 218 208

(51) Int. Cl.
| | |
|---|---|
| *B01D 65/02* | (2006.01) |
| *B01D 63/02* | (2006.01) |
| *B01D 63/04* | (2006.01) |
| *B01D 65/08* | (2006.01) |

(Continued)

(52) U.S. Cl.
CPC ........... *B01D 65/02* (2013.01); *B01D 63/024* (2013.01); *B01D 63/043* (2013.01); *B01D 65/08* (2013.01);

(Continued)

(58) Field of Classification Search
CPC combination set(s) only.
See application file for complete search history.

(56) References Cited

U.S. PATENT DOCUMENTS

| | | | | |
|---|---|---|---|---|
| 1,776,032 A | * | 9/1930 | Kobernik | B01D 3/205 |
| | | | | 261/114.2 |
| 3,997,634 A | * | 12/1976 | Downs | B01F 3/0412 |
| | | | | 239/533.14 |

(Continued)

FOREIGN PATENT DOCUMENTS

| | | |
|---|---|---|
| EP | 0947237 A1 | 10/1999 |
| JP | H1066834 A | 3/1998 |

(Continued)

*Primary Examiner* — Bobby Ramdhanie
*Assistant Examiner* — Michael J An
(74) *Attorney, Agent, or Firm* — Von Rohrscheidt Patents

(57) ABSTRACT

A membrane filter for filtering a liquid to be filtered, the membrane filter including at least one membrane carrier to which membranes are fixed, the membranes allowing a liquid permeate to be filtered out of the liquid, and the membrane carrier includes a permeate collecting chamber to which the membranes are connected in an open manner on the permeate side, and also comprises a permeate outlet for the discharge of the permeate out of the permeate collecting chamber; a gas distribution system which is arranged below the at least one membrane carrier and which has at least one downwardly open and upwardly closed tub which has a wall with downwardly open vertical slots for the distribution of a gas into the liquid to be filtered, at least one gas inlet leading into the gas distribution system. The invention also relates to a method for filtering a liquid.

11 Claims, 18 Drawing Sheets

(51) Int. Cl.
*C02F 1/44* (2006.01)
*C02F 3/12* (2006.01)

(52) U.S. Cl.
CPC ...... *B01D 2313/26* (2013.01); *B01D 2321/18* (2013.01); *B01D 2321/185* (2013.01); *C02F 1/444* (2013.01); *C02F 3/1268* (2013.01); *Y02W 10/15* (2015.05)

(56) References Cited

U.S. PATENT DOCUMENTS

| | | | | |
|---|---|---|---|---|
| 8,287,743 | B2* | 10/2012 | Zha | B01D 63/024 |
| | | | | 210/797 |
| 2003/0128797 | A1* | 7/2003 | Ohashi | B01D 35/06 |
| | | | | 376/305 |
| 2004/0035779 | A1* | 2/2004 | Vossenkaul | B01D 63/024 |
| | | | | 210/321.6 |
| 2009/0255872 | A1* | 10/2009 | Busnot | B01D 61/18 |
| | | | | 210/636 |
| 2011/0272335 | A1* | 11/2011 | Cote | B01D 61/18 |
| | | | | 210/150 |
| 2012/0091602 | A1* | 4/2012 | Cumin | B01D 61/18 |
| | | | | 261/122.1 |

FOREIGN PATENT DOCUMENTS

| | | | |
|---|---|---|---|
| JP | 2005305250 A | | 11/2005 |
| JP | 2011131218 A | | 7/2011 |
| WO | WO2010081228 | | 7/2010 |
| WO | WO2011136888 A1 | | 11/2011 |
| WO | WO2012134127 A2 | | 10/2012 |

\* cited by examiner

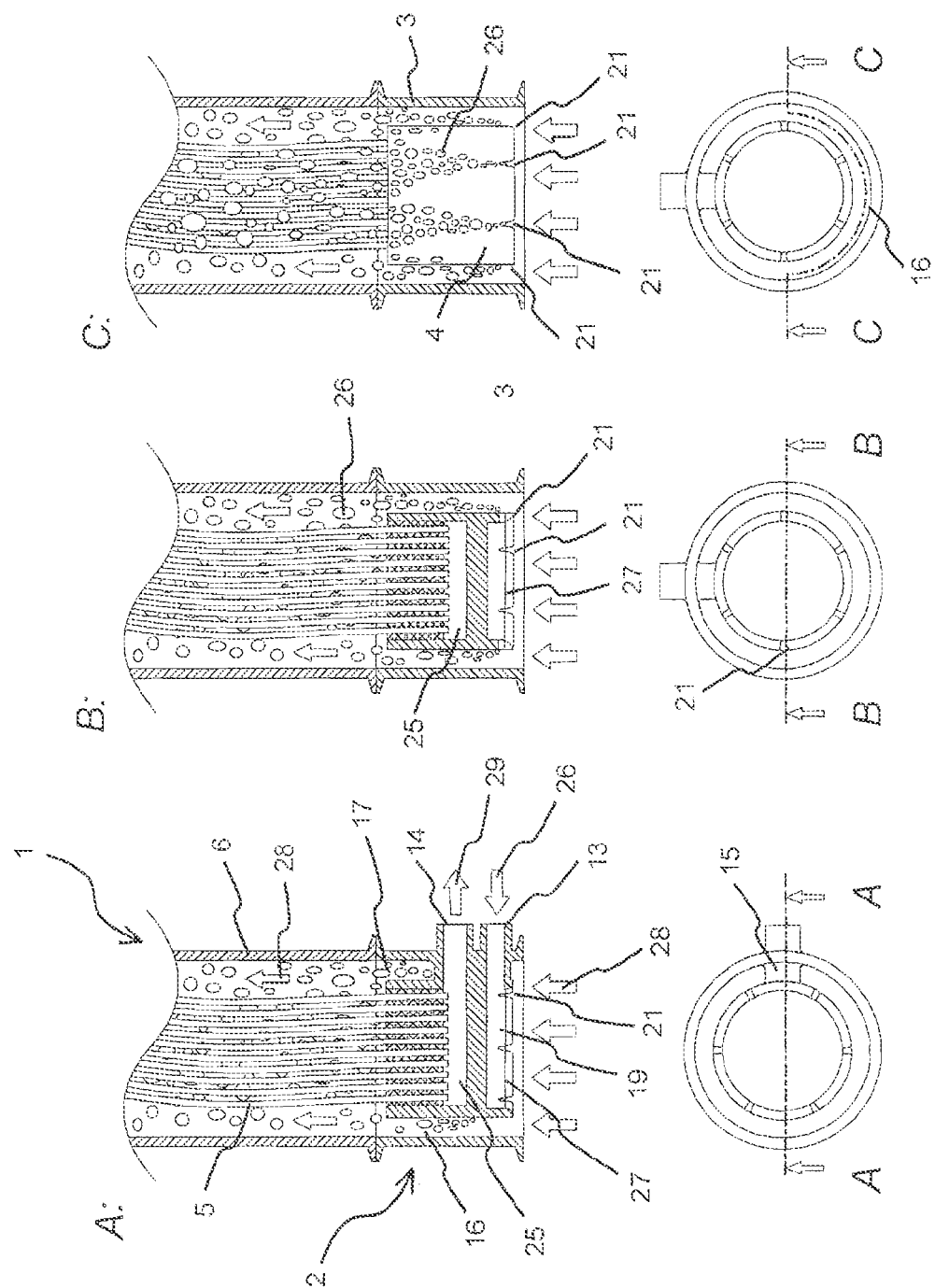

MEMBRANE FILTER AND FILTERING METHOD

RELATED APPLICATIONS

This application is a continuation of International Patent Application PCT/EP2014/068068 filed on Aug. 26, 2014 claiming priority from German patent application DE 10 2013 218 208.2 filed on Sep. 11, 2013, both of which are incorporated in their entirety by this reference.

FIELD OF THE INVENTION

The invention relates to a membrane filter for filtering a liquid to be filtered, the membrane filter comprising including at least one membrane carrier at which membranes are attached which membranes facilitates filtering a liquid permeate from the liquid and wherein the membrane carrier includes a permeate collecting cavity at which the membranes are connected with an open permeate side, and a permeate outlet for letting the permeate out of the permeate collecting cavity; a gas distribution system arranged below the at least one membrane carrier and including at least one downward open and upward closed tub which includes a wall with downward open vertical slots for distributing a gas into the liquid; and at least one gas inlet into the gas distribution system.

The invention also relates to a method for filtering a liquid in a membrane filter including at least one membrane carrier, at least one gas inlet, and a gas distribution system with at least one downward open and upward closed tub which includes a wall with downward open slots, wherein a gas flows through the at least one gas inlet into the at least one tub the gas fills the at least one tub and the slots up to a portion of a height of the slots with a gas cushion, the gas flows out the gas cushion through the slots in a laterally outward direction from the at least one tub and thus flows at several locations below the at least one membrane carrier into the liquid, the gas generates a liquid flow at a phase boundary below the gas cushion during a lateral flow of the gas through the slots wherein the liquid flow is parallel to the lateral gas flow, the gas rises in the membrane filter, and thus generates an upward movement of the liquid in the membrane filter.

BACKGROUND OF THE INVENTION

Membrane filters of this general type that are known in the art are configured for filtering waste water that is heavily loaded with solids like they can be found for example in biologic waste water treatment plant in membrane bioreactors (MBR). The membrane filter can either be submerged in the tanks of the waste water treatment plant or can be provided with inlet and outlet conduits and can be set up on dry land integrated in a pipe. The driving force for the filtration is implements in most cases through a vacuum applied on the permeate side but can also be implemented for the dry set up variant by a low feed side (raw water side) positive pressure.

The membranes that are fixated in the membrane carrier can be in particular hollow fiber membranes which have a diameter of less than 5 mm but they can also be flat membranes. Thus a portion of the membrane filter is designated as the membrane carrier in which portion the membranes are fixated. Hollow fiber membranes are typically attached at least on a bottom in a membrane carrier, typically additionally also on top in a second membrane carrier. Also membrane filters with flat membranes include membrane carriers at which the flat membranes are attached. The flat membranes themselves have a permeability of microfiltration membranes or ultra-filtration membrane. Using membranes for reverse osmosis or nano filtration is possible. Typically hollow fiber membranes in a diameter range of 0.5-3 mm are being used.

In order to prevent a blocking of the membrane filters by filtered materials the membrane filter is flushed continuously or in periodic internals. Typically used physical flushing methods for the membrane filter use a permeate side back flushing of the membranes with liquid or gas combined with a gas bubble flushing on an outside of the membranes. Rising gas bubbles typically also generate an upward flow of the liquid to be filtered which is designated as mammoth pumping effect. A shear force of the 2 face flow including gas and liquid generates a high level of turbulence which removes coatings from the membranes and flushes them out. In membrane bioreactors air is typically used as a gas.

A membrane filter of this type is known from JP 10 06 63834. Thus plural membrane carriers with membranes attached therein which are not specified in more detail are arranged above a gas distribution system which includes plural downward open and upward closed tubs which have walls with downward open vertical slots for distributing the gas into the liquid.

In the known membrane filter the tub has the shape of a downward open cuboid or half cylinder with slots that are laterally arranged in the wall, extend vertically and are open in a downward direction. The known membrane filter has plural gas inlets into the gas distribution system which respectively connect to an interior of the tubs from above through a sealing of the tubs.

Through the gas inlets a gas flows from above into the tubs and fills the tubs up to a portion of the height of the tubs with a gas cushion. Thus also the slots fill up to an identical level with gas since the slots are open in outward direction the gas flows out of the gas cushion through the gas filled portion of the slots laterally out of the tub and thus flows at several locations below the membranes into the liquid to be filtered. In order to be able to compensate variations in the gas volume the slots are typically sized for normal operations so that they are only partially filled with gas. The filling level of the tub with gas and thus also the filling level of the slots is a function of the gas volume flow that flows into the gas distribution system. For higher gas volume flows the gas backs up in the tub to a higher level and thus a larger portion of the slots is filled with gas, this means the flow through cross section for the gas increases and a higher volume of gas flows through the slots. Up to a complete back up of the tub the gas flows out of the slots evenly. Only when the gas volume becomes large enough so that the tub flows over the additional gas volume exits from the tub in an uncontrolled manner.

After the gas flows out of the slots the gas subsequently rises in the membrane filter and thus generates an upward movement of the liquid through the membrane filter according to the mammoth pumping principle. The high shear force effect of the 2 face flow including the rising liquid and the gas thus flushes the membranes, wherein coatings and deposits are removed and carried out of the filter.

During lateral flow through the slots the gas generates a liquid flow that is oriented parallel to the lateral gas flow at a face boundary below the gas cushion wherein the liquid flow impacts the portion of the wall between the slots that protrudes on a bottom out of the gas cushion. This flow typically flushes in hair or fibrous compounds in membrane bioreactors, in particular in applications for municipal waste water processing.

In the membrane filter described in JP 10 06 6834 sections of the wall between the slots protruding from a bottom of the gas cushion act like a comb or rake upon hair and fibrous compounds included in the liquid to be filtered wherein the hair and fibrous compounds easily lodge in the slots. When the hair is carrier for example by the flow with one end into one slot and with another end into an adjacent slot the hair is retained at flow leading edges of the wall between the slots which can lead to a blocking of the slots. Thus the gas volume flowing through these slots is obstructed up to a complete blockage. As a consequence insufficient gassing and flushing is provided for a membrane portions that are arranged there above which creates a risk of blocking these portions.

BRIEF SUMMARY OF THE INVENTION

Thus it is an object of the invention to provide a membrane filter with reduced blocking propensity.

Improving upon known membrane filers it is proposed according to the invention that the at least one tub includes an inner edge respectively between adjacent slots in at least one vertical sectional view orthogonal to the wall which inner edge at least in a portion of a lower half of the slots has an angle relative to horizontal of less than 60° in any point. This configuration can either be implemented by a greater slant angle or rounding this inner edge. This creates a flow impact portion at lower inner edges of the wall for the liquid flowing below the gas cushion wherein hair and fibrous compounds are stripped off by the liquid flow in the flow impact portion which reduces the blocking propensity of the slots and of the membrane portion arranged there above.

In an advantageously embodiment of the membrane filter according to the invention the gas distribution system is configured at a bottom side of the at least one membrane carrier. In this case the membrane carrier and the gas distribution system are one component. Thus the gas is distributed into the liquid to be filtered directly at a bottom side of the membrane carrier, thus at locations where it exits from the gas distribution system. Thus the gas bubbles flow around the membrane carrier and the membranes attach therein directly at their intended locations. The configuration of the gas distribution system at the bottom side of the membrane carrier helps to prevent potential deviating gas flows.

Due to the small blow in depth an energy requirement for the gas loading is reduced compared to systems with a gas distribution system that is separately installed below the membrane carrier. The low production costs presents another advantage since the membrane filter has one less component due to the configuration of the gas distribution system at a base of the membrane carrier.

In order to provide a stripping of hair and fibrous compounds at the rounded or slanted inner edge of the tub a horizontal extension of this inner edge of approximately of 10-15 mm is required. In the simplest case this requirement causes a configuration of the tub that is configured accordingly thick.

In the membrane filter according to the invention the gassing system can be installed in an alternative as a separate component below the membrane carrier and offset therefrom. The gas distribution system in this case can be configured as a separate component. However the offset between the gas distribution system and the membrane carrier also has a disadvantage. In the liquid filled flow portion between the gas distribution system and the membrane carrier the gas bubbles can be deflected by transversal flows in the bio reactor or other flows and may not impact the membrane carrier at the provided location which does not assure an even gassing of the membranes any more. Furthermore the energy requirement for the gassing increases due to the greater blow in depth. For a blow in depth of 2 meters 20 cm additional blow in depth already would require 10% more energy.

In the configuration of the membrane filter it is advantageous that the at least one tub includes at least one vertical rib that extends from the wall inward between adjacent slots wherein an extension of the vertical rib decreases in downward direction going into the at least one tube. When the gas distribution system and also the tub is configured as an injection molded component the thicker wall has the disadvantage of material accumulations. Figuratively speaking the ribs are the only portion of the thickened wall which is maintained while the other portions of the thicker wall remain cut off so that only one wall in the otherwise typical thinner wall thickness of the component remains. The ribs prevent material accumulations in the component and facilitate producing it as an injection molded component. In this case the ribs form the portion of the wall between respectively adjacent slots where hair and fibrous compounds can be stripped off in an outward direction. The vertical sectional view which includes an inner edge which at least in a portion of a lower half of the slots has an angle relative to horizontal of less than 60° in each point extends in this case longitudinally through the ribs.

Since the ribs are a left over of the thickened wall of the tub they require the same horizontal extension of approximately 10-15 mm. Thus, there are limits for the configuration of the tub. Thus tubs with a total width under 3% cannot be configured with useful flow dynamic properties since the remaining open flow cross section between the ribs in an interior of the tub is typically too small to let the entire gas volume glow through.

In a membrane filter according to the invention the tub of the gas distribution system can have different plan forms from circular over rectangular and polygonal to completely free shapes. When the gas distribution system and thus also the tub are configured at a bottom side of the membrane carrier the tub as a matter of consequence reflects some of the geometric details and dimensions of the membrane carrier.

In an advantageous embodiment of the membrane filter according to the invention the gas distribution system includes downward open gas conduction channels which adjoin at least a portion of the slots on an outside for further conduction and distribution of the gas away from the at least one tub. Thus it is an advantage of the gas distribution channels to also facilitate significantly smaller components for the gas distribution system.

Thus the membrane carrier of a membrane filter according to the invention can include for example an anchor at which plural fingers are arranged at which membranes are attached on top. When the tub is configured for example according to the invention below, the gas conduction channels are formed on a bottom side of the fingers and facilitate conducting the gas into portions of the membrane filter that are further remote from the tub.

The gas conducting channels of a membrane filter according to the invention have a base which either extends horizontally or has a slope relative to horizontal so that the end of the gas conducting channels is arranged above the position of the their beginnings adjoining the slots. Through the sloped base forwarding the gas in the gas conduction channels is accelerated and a blocking risk of the gas conduction channels is reduced.

In another advantageous embodiment of a membrane filter according to the invention the gas conduction channels adjoin the slots with a vertical upward offset. Thus the interaction between the slots and the adjoin gas conduction channels is significantly reduced which provides a more even flow through of the slots without and with the connected gas conduction channels. Additionally gas conduction channels that are further offset upward and adjoin the slots can help implement a configuration of the components that more favorable from an injection molded point of view since material accumulations in the component are avoided.

In another advantageous embodiment of the membrane filter according to the invention the slots become wider in downward direction, this has the advantage that the cross sectional surface of the slots increases over proportionally for an increasing volume flow and a gas cushion in the tub that backs up further downward. Thus the gas pressure in the gas inlet only increases minimally which improves the self-regulation of the even flow through of the slots and thus the evenness of the gassing. The slots that become wider in downward direction thus form a variable "throttle" for the gas volume flowing through the slots for different gas volume flows. Through the cross sectional shape of the throttle the volume dependent filling level in the slots can be influenced.

In another advantageous embodiment of the membrane filter according to the invention the slots have cross sectional surfaces with different sizes. This because different geometric configuration of the tub, in particular also when gas conduction channels are connected at some of the slots which shall facilitate flushing differently sized membrane surfaces with the gas volume flowing through the different slots it is advantageous to adapt the gas volume flowing through the slots through the geometric configuration of the slots to adapt to different required gas volumes. Thus in slots to which a gas conducting channel adjoins which transports the gas into portions of the membrane filter which are arranged further outward and away from the tub larger cross sectional surfaces of the slots are implemented in that the slots have a greater width.

In another advantageous embodiment of the membrane according to the invention the at least one gas inlet laterally adjoins the at least one tub. This is part advantageous when the gas distribution system is configured at a bottom side of the membrane carrier. In this case the gas distribution is provided at the level of the slots which helps to prevent vertical flows of the gas and thus a sloshing of the gas cushion out of the tube.

In case of a gas distribution system that is separated from the membrane carrier the gas inlet can be alternatively also provided from above through the base of the tub that is arranged on top. Alternatively a gas inlet that is separate from the tub and the gas distribution system can provide that the gas flows into the tub for example from a separate tube that is positioned below the tub.

Improving upon the known method it is provided according to the invention that the liquid flow generated below the gas cushion flows respectively between adjacent slots in at least one vertical sectional view orthogonal to the wall against an inner edge of the at least one tub which inner edge at least in a portion of a lower half of the slots has an angle relative to horizontal of less than 60°. Thus hair and fibrous compounds at the inner edge are stripped off and blocking the slots and the membrane portions arranged there above is substantially avoided. Thus the blocking propensity of the membrane filter is reduced overall.

In another advantageous embodiment of the method according to the invention the gas flows after flowing through some of the slots through gas conducing channels in to portions of the membrane filter that are moved further outward from the at least one tub. This facilitates an overall even distribution of the gas over the entire cross section of the membrane filter. In another advantageous embodiment of the method according to the invention the gas flows from a gas distribution system formed at a bottom side of the at least one membrane carrier and flows around the at least one membrane carrier after flowing into the liquid. This has the advantage that the gas before reaching the membrane carrier does not have to flow through any additional flow portion in which it can be prevented from reaching its destination at the membrane carrier.

In order to perform a method according to the invention the membrane filter can be submerged in the liquid. The membrane filter is then surrounded by the liquid to be filtered and the mammoth pumping effect of the gas that is introduced into the base element and which rises in the membrane filter the liquid to be filtered is suctioned from below into the base element and flows through the filter unit together with the gas before both flow out on top of the filter unit.

When performing the method according to the invention the liquid to be filtered can be supplied to the base element by a first liquid conductor and can be let out from the filter unit by a second liquid conductor, wherein the second liquid conductor is connected to a tube above the membranes which envelops the membranes and adjoins the base element on top. This variant of operations of a filter unit according to the invention is also designated as dry set up operations.

When implementing larger filter units plural membrane filters according to the invention can be mounted parallel adjacent to each other on a common frame. Thus the permeate outlets of the individual membrane filters are connected with tubular conduits which are used for running the generated permeate out of the membrane filters. Also the gas inlets are connected with the tubular conduits which are used for feeding the gas into the membrane filters. Thus the gas feed conductors can be individually configured with throttles to even the air supply to the individual membrane filters. Thus it is advantage to position the throttles in the gas supply lines above the liquid surface in order to preclude flooding the throttle cross sections also when the filter is switched off and thus to preclude a clogging of the throttles with solid components of the liquid.

BRIEF DESCRIPTION OF THE DRAWINGS

The invention is subsequently described based on embodiments with reference to drawing figures, wherein:

FIGS. 2A-2C illustrate flow conditions in the first membrane filter;

DETAILED DESCRIPTION OF THE INVENTION

Figure 1A:
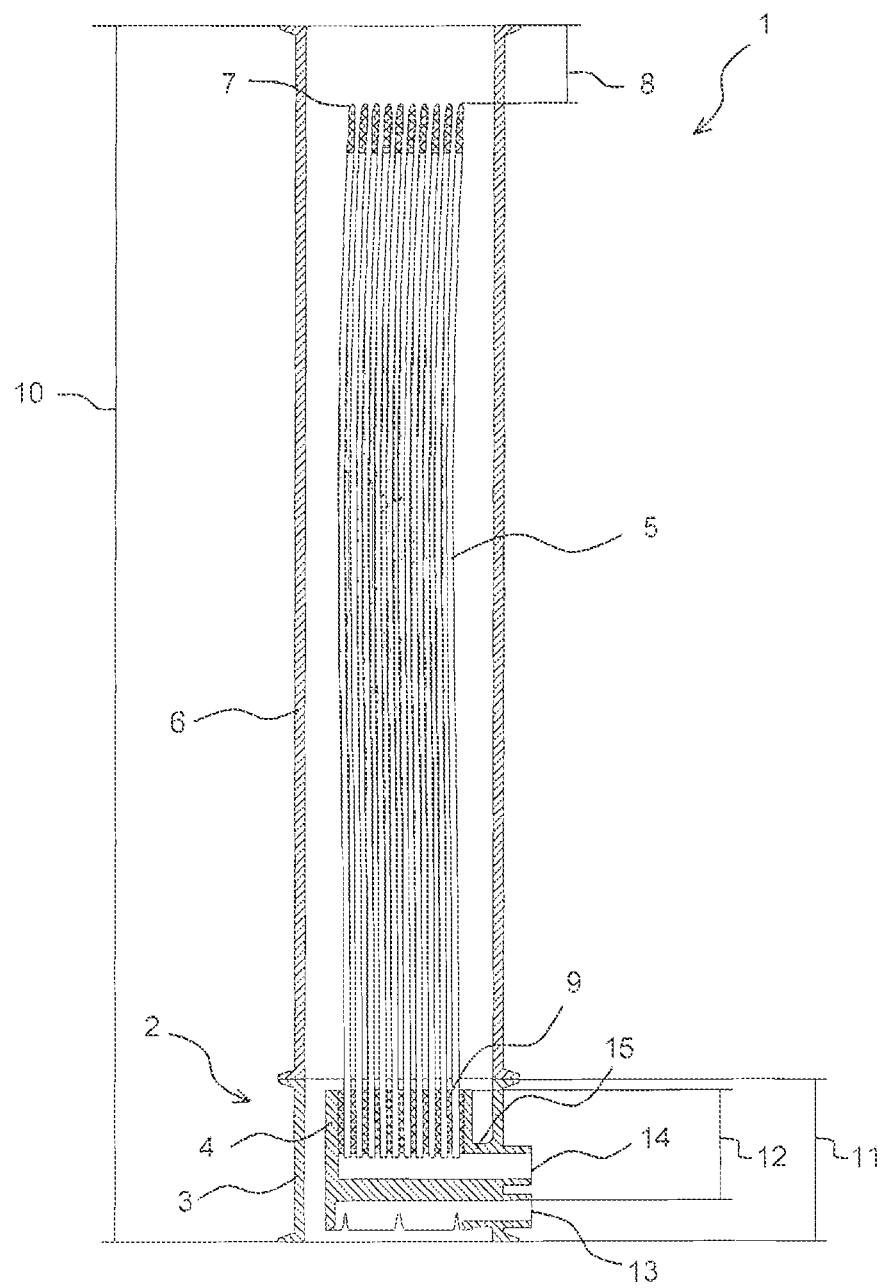
FIGS. 1A-1E illustrate a first embodiment of the membrane filter according to the invention (total sectional view, partial sectional views and views of the base element)
Figure 1B:
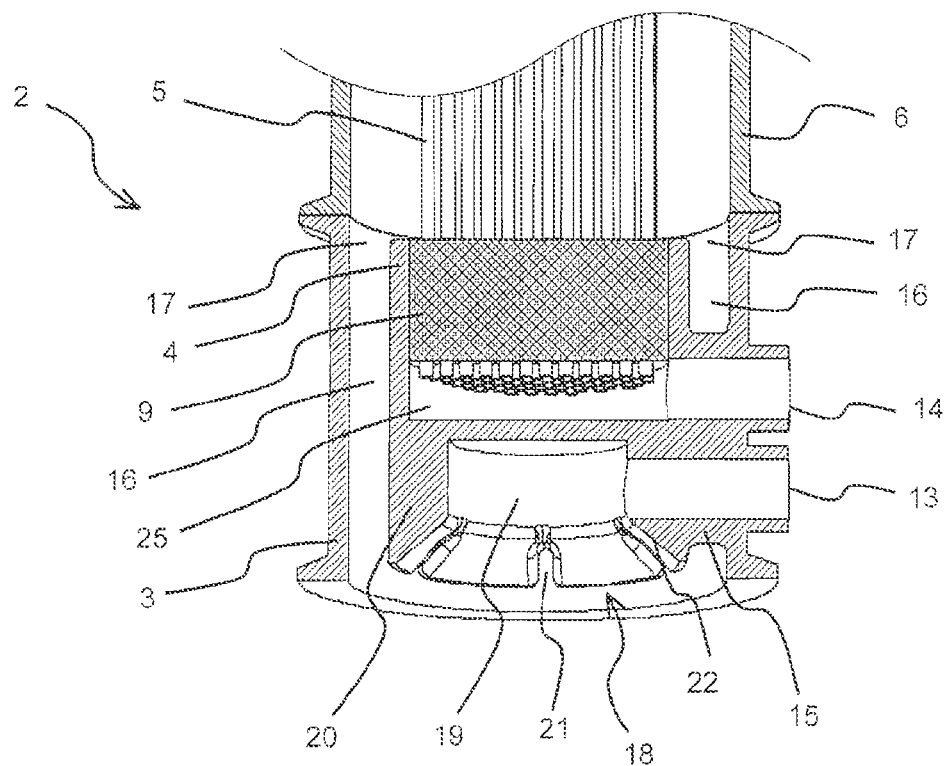
Figure 1C:
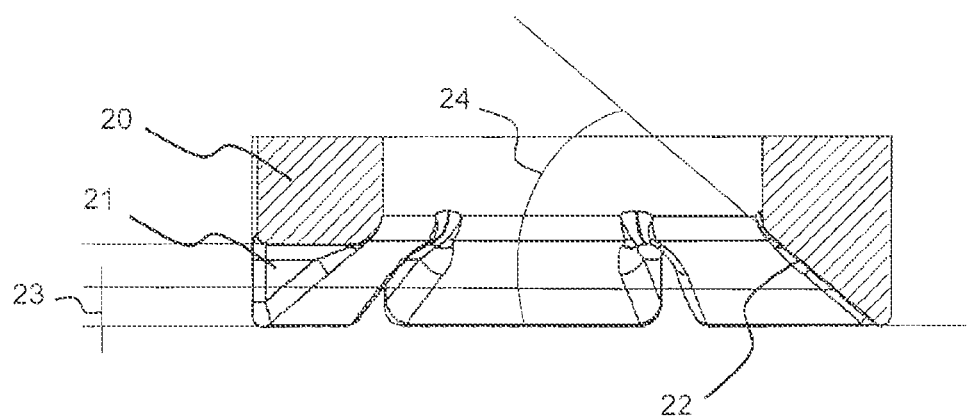

The drawing figures are not to scale. All non stated details of subsequently described membrane filters according to the invention are identical with embodiments of previously described membrane filters according to the invention.

FIGS. 1A-1E illustrate sectional views and views of a first membrane filter 1 according to the invention. This membrane filter includes a base element 2 with a shell 3 and a membrane carrier 4 arranged therein in which hollow fiber membrane 5 are arranged on top. A cylindrical tube 6 adjoins the shell 3 of the base element 2 on top of the base element 2.

The hollow fiber membranes 5 are fabric reinforced and have an external diameter of 2.5 mm. They are individually closed at an upper end 7. The tube 6 extends beyond the upper end 7 by a length of 8 cm to 10 cm. The hollow fiber membranes 5 are cast in in a sealing manner in the membrane carrier 4 by a resin layer 9, wherein lumens of the hollow fiber membrane 5 remain open.

The membrane filter 1 has a height 10 of 200 cm the base element 2 has a height 11 of 12 cm and the membrane carrier 4 has a height 12 of 11 cm. The base element 2 and the tube 6 both have an external diameter of 75 mm. The tube 6 has an internal diameter of 68 mm. The base element 2 furthermore includes a gas inlet 13 and a permeate outlet 14.

The membrane carrier 4 is connected with the shell 3 through an anchor location 15. The base element 2 includes a flow cavity 16 between the shell 3 and the main membrane carrier 4 wherein the flow cavity is configured as an annular gap with a width of 9 mm, envelops the membrane carrier 4 and is only interrupted by the anchor location 15. The flow cavity 16 is adjacent in each horizontal sectional view to the shell 3 and also to the membrane carrier 4.

The flow cavity 16 is limited in vertical direction by the overlap portion of the height 11 of the base element 2 and the height 12 of the membrane carrier 4. The base element 2 is open in downward direction and capable of flow through. The flow cavity 16 includes an outlet 17 on top into the tube 6.

The gas inlet 13 is connected with a gas distribution system 18 configured on a bottom side of the membrane carrier 4 wherein the gas distribution system includes a tub 19 that is open in downward direction and closed in upward direction, wherein the tub includes a wall 20 with downward open vertical slots 21. The tub 19 includes an inner edge 22 respectively in a center between adjacent slots 21 in a sectional view that is vertical and orthogonal to the wall 20, wherein the inner edge 22 is a slanted edge over an entire height of the slots 21 wherein an angle 24 of the slanted edge 22 is 40° relative to horizontal. Alternatively the inner edge 22 in a portion of a lower half 23 of the slots 21 can have an angle 24 relative to horizontal that is less than 60° in any point.

The base element 2 furthermore includes a permeate collecting cavity 25 into which the lumens of the hollow fiber membrane lead. The permeate collecting cavity 25 is connected with the permeate outlet 14 of the base element 2.

Figure 1D:
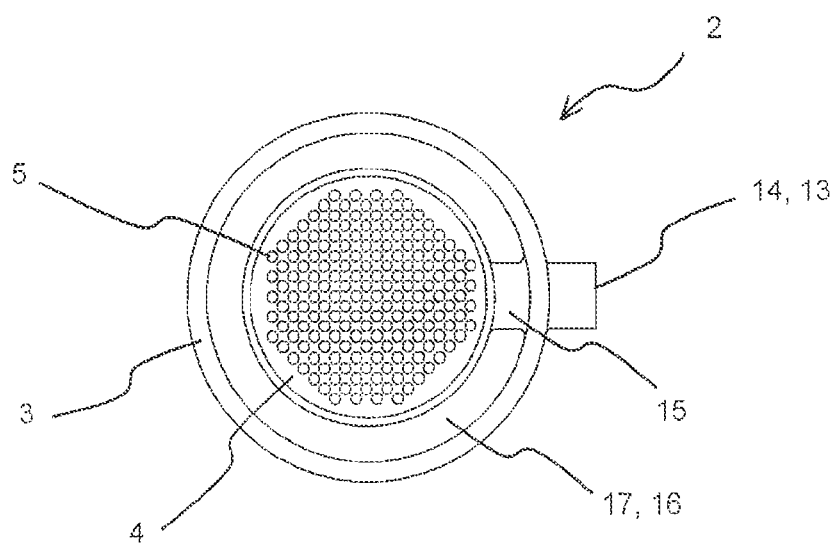
Figure 1E:
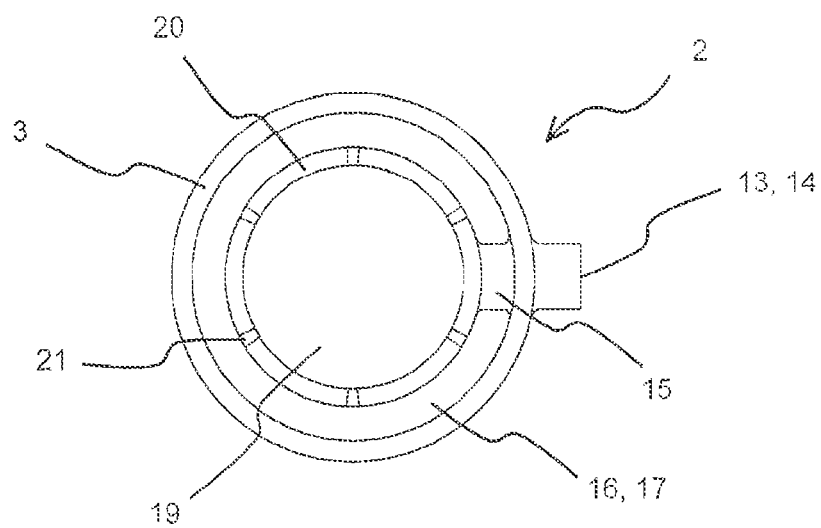

FIG. 1D illustrates a top view of the base element 2 with the hollow fiber membranes 5 without the tube 6. The number of the illustrated hollow fiber membranes 5 does not correspond to an actual number of the actual hollow fiber membranes 5. FIG. 1E illustrates a view of the base element 2 from below. The number of slots 21 is 6. The slots are evenly distributed over a circumference of the top 19 in the wall 20 of the top 19.

The permeate outlet 14 and the gas inlet 13 are arranged in a radially outward extension of the anchor location 15.

FIGS. 2A-2C illustrate the flow conditions in the base element 2 and in the lower portion of the tube 6 of the first membrane filter 1 during filtering operations.

Thus, FIG. 2A illustrates a first vertical sectional view of the lower portion of the membrane filter 1, wherein the sectional view also extends through the anchoring location 15.

A gas 26 is introduced into the base element 2 and the flow cavity 16 through the gas inlet 13 during operations of the membrane filter 1 thus the gas 26 flows through the gas inlet 13 initially into the tub 19. The gas 26 fills the tub 19 up to a portion of the height of the slots 21 and forms a gas cushion 27 in the tub, 19. The gas 26 also fills the slots 21 up to the level of the gas cushion 27 and eventually flows laterally through the portion of the slots 21 that are filled with the gas 26 out of the tube 19 or out of the gas cushion 27 and thus into a liquid 28 that is to be filtered.

Besides the flow cavity 16 the membrane carrier 4 closes the base element 2 completely for the flow through of the liquid 28 and of the gas 26, this means besides the flow cavity 16 there are no additional pass through openings for the gas 26 and the liquid 28 in the base element 2.

Above the base element 2 there are no additional installations in the tube 6 besides the hollow fiber membranes 5. Therefore the hollow fiber membranes 5 float freely in the liquid 28 without impediment and are only fixated at their bases. Thus also hair, fibrous compounds or other contaminants from the liquid 28 cannot be lodged in this portion.

During lateral flow through the slots 21 the gas 26 generates a radially outward oriented liquid flow that is parallel to the lateral gas flow at a face boundary surface below the gas cushion 27. The liquid flows between respective adjacent slots 21 against and inner edge 22 of the wall 20 which has an angle relative to horizontal of less than 60° in each point in the portion of the slots. At this slanted inner edge hair and fibrous compounds included in the liquid 28 to be filtered are stripped off through the outward oriented gas flow and liquid flow which reduces a risk of these contaminants lodging in the membrane filter 1.

After flowing through the slots 21 the gas 26 rises through its buoyancy in the membrane filter 1 and generates an upward flow of the liquid 28. This liquid flow is suctioned into the membrane filter only from below. The gas 26 and the liquid 28 flow through the flow cavity 16 of the base element 2 and jointly flow through the outlet 17 into the tube 6 and above at the tube 6 out of the membrane filter 1.

The strong shear force effect of the two phase flow including the liquid 28 and the gas 26 which rises through the mammoth pumping effect in the membrane filter 1. The membrane carrier 4 is flushed on the outside in the flow cavity 16 of the base element 2 and the hollow fiber membranes 5 are flushed on the outside in the tube 6 and thus coatings and deposits are flushed off from the surfaces of the membrane carrier 4 and of the hollow fiber membranes 5 and are carried out the membrane filter 1.

Between the outside of the hollow fiber membranes 5 and their lumens there is a pressure differential based on which a liquid permeate 29 is filtered out the liquid 28 and flows into the lumens of the hollow fiber membranes 5. The permeate 29 is collected from the lumens of the hollow fiber membranes 5 and then flows through the permeate outlet 14 out of the membrane filter 1.

Through the anchor location 15 the gas 26 is supplied and the permeate 29 that is filtered in the membrane filter 1 is drained.

The gas inlet 13 is flow connected with the flow cavity 16 within the base element 2, so that the base element 2 is flowable from the gas inlet 13 through the tub 19, through the slots 21 and through the flow cavity 16 to the outlet 17.

FIG. 2B illustrates an additional sectional view of the lower portion of the membrane filter 1 which sectional view however is turned by 90°. Thus the anchor location 15 is not sectioned but 2 of the slots 21. The lateral outflow of the gas 26 through the slots 21 from the tub 19 or from the gas cushion 27 are visible. Additionally this sectional view shows the permeate collecting cavity 25 but does not show the permeate outlet 14.

FIG. 2C illustrates another sectional view of the lower portion of the first membrane filter 1 which in this case only sections the shell 3 and otherwise extends through the flow cavity 16 so that the outside of the membrane carrier 4 becomes visible. Thus the lateral outflow of the gas 26 from the slots 21 is visible.

Figure 3:
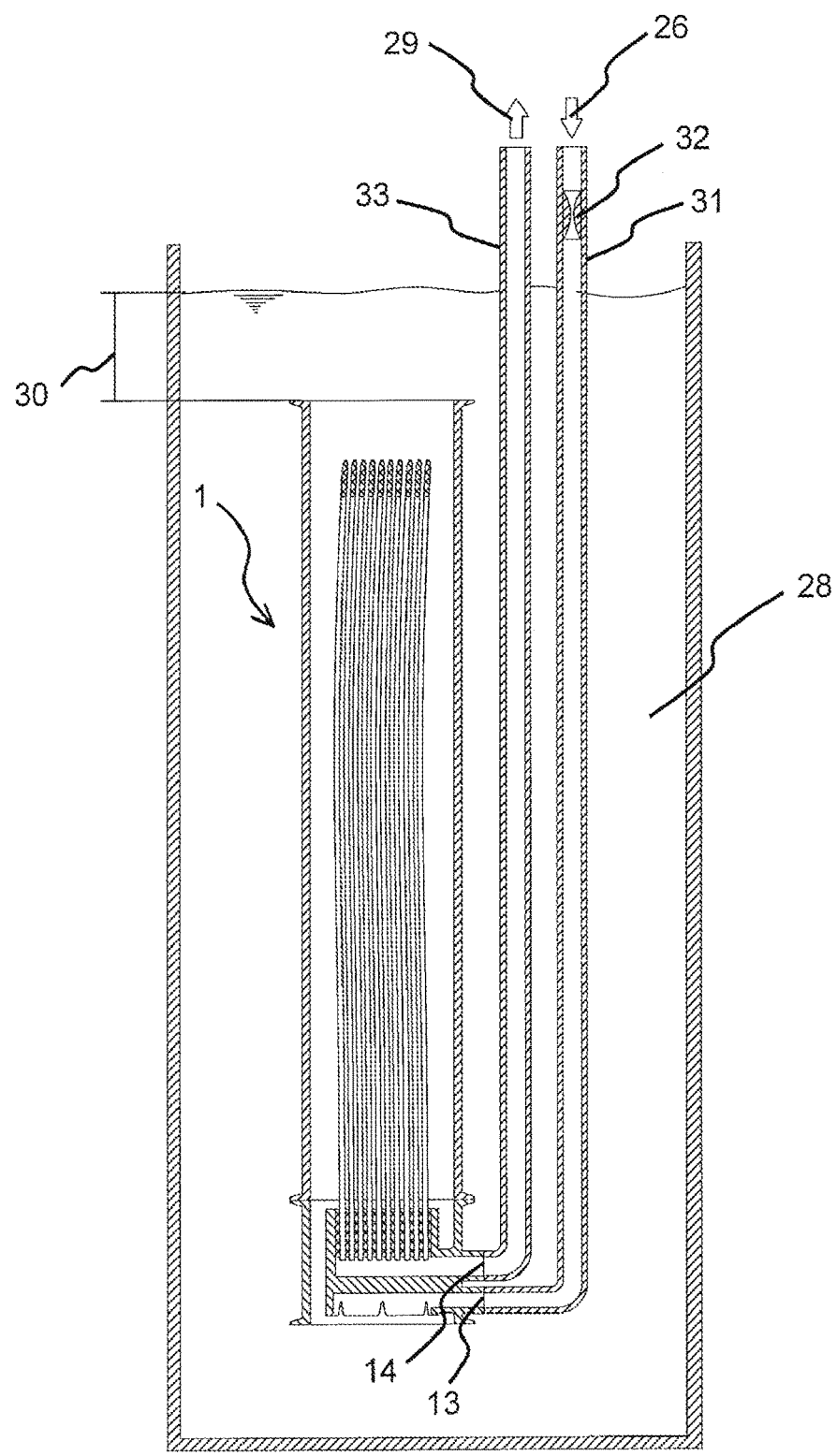
FIG. 3 illustrates the first membrane filter in submerged operations.

FIG. 3 illustrates the first membrane filter 2 is submerged operations. Thus gas bubbles in the liquid 28 are not illustrated. Thus the membrane filter 1 is submerged in a tank with the liquid 28 to be filtered so that a liquid overhang 30 of 15 cm remains above the membrane filter 1 to the surface of the liquid 28. Through a gas feed conductor 31 the gas 26 is run from above the surface of the liquid 28 to the gas inlet 13. A throttle 32 is installed in the gas feed conduit 31. The throttle is illustrated at this location in an exemplary manner and is only required when plural membrane filters 1 are operated in parallel and supplied with gas 26 simultaneously. The throttles 32 in the gas feed conduits 31 are used for balancing volumes of gas 26 flowing into the individual membrane filters 1. The throttle 32 is arranged above the surface of the liquid to be filtered. Through a permeate conductor 33 the permeate 24 generated in the membrane filter 1 is drained by the permeate outlet 14.

Figure 4:
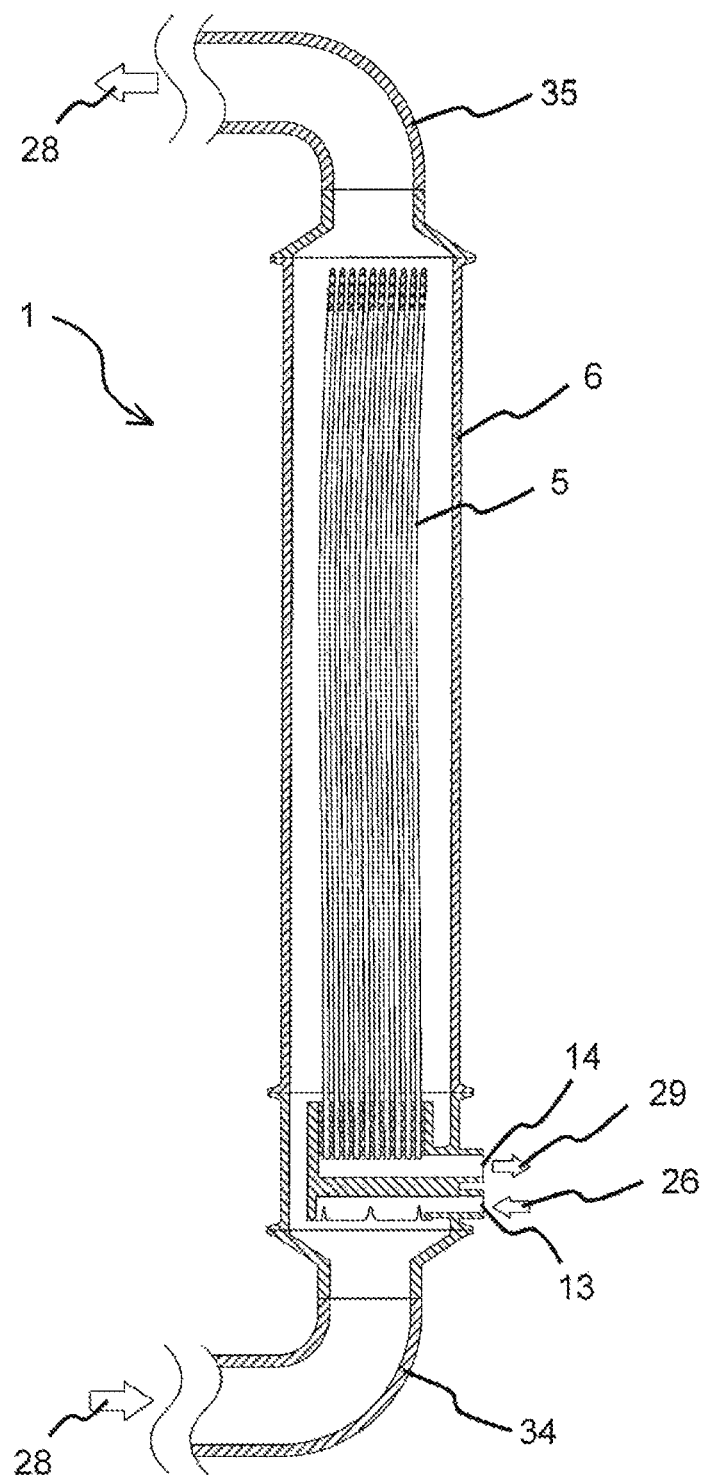
FIG. 4 illustrates the first membrane filter in dry set up operations.

FIG. 4 illustrates the first membrane filter 1 according to the invention in dry set up operation. Gas bubbles in the liquid 28 to be filtered are thus not illustrated. The liquid 28 is supplied to the membrane filter 1 through a first liquid conduit 34. A permeate 29 if filtered from the liquid 28 and drains through the permeate outlet 14. Through the gas inlet 13 the gas 26 is supplied. Through a second liquid conduit 35 the gas 26 and the liquid 28 minus the permeate 29 are drained. The second liquid conduit 35 is connected at a top of the tube 6 wherein the tube extends beyond the hollow fiber membranes 5.

FIGS. 5A-5G illustrate views and various sectional views of a second membrane filter 36 according to the invention.

Figure 5A:
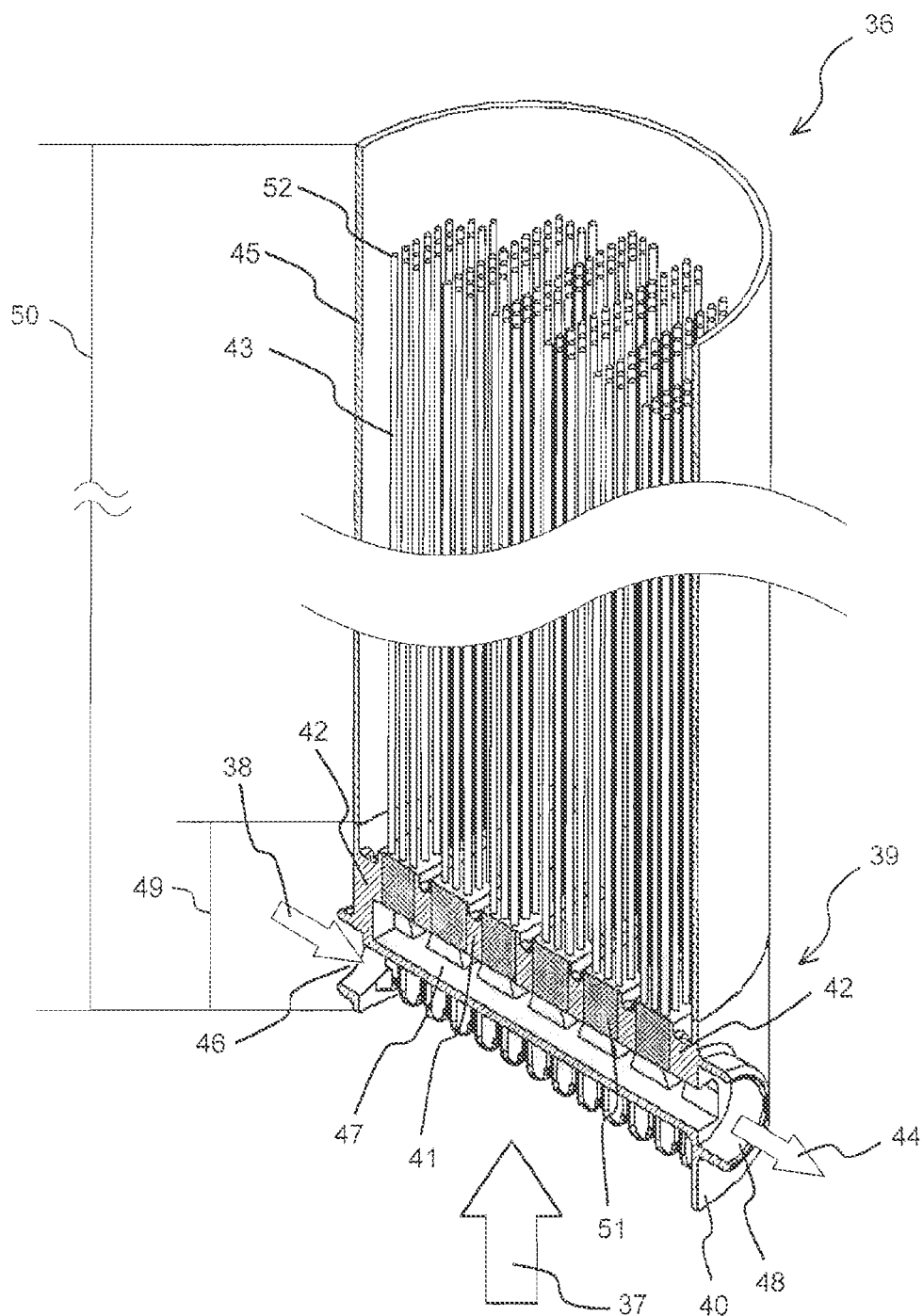
FIGS. 5A-5I illustrate details of the second embodiment of the membrane filter according to the invention.

FIG. 5A illustrates a longitudinal sectional view of the second membrane filter 36. The second membrane filter 36 includes a base element 39 that is open in downward direction towards a liquid 37 to be filtered and that is flowable by a gas 38 and a liquid 37 wherein the base element includes a tubular shelf 40 and precisely one membrane carrier 41 arranged therein, wherein the membrane carrier 41 is connected with the shell 40 through 2 anchor locations 42. Hollow fiber membranes 43 are attached on top in the membrane carrier 41 wherein the hollow fiber membranes respectively include a lumen into which a liquid permeate 44 from the liquid 37 is filterable. Additionally the membrane filter 36 includes a circumferentially closed tube 45 which envelops the hollow fiber membranes 43 and adjoins the shell 40 or the base element 49 at a top and a gas inlet 46 for letting the gas 38 into the base element 39. The base element 39 includes a permeate collecting cavity 47 which is connected with the lumens of the hollow fiber membranes 43 collecting the permeate 44 from the hollow fiber membranes 43 and a permeate outlet 48 for draining the permeate 44 from the permeate collecting cavity 47.

The base element 31 has a height 49 of 12 cm and the membrane filter 36 has a height 50 of 212 cm. The hollow fiber membranes 43 are encased at a bottom in the membrane carrier 41 by a resin layer 51 against the liquid 37 to be filtered in a sealing manner, wherein the lumens of the hollow fiber membranes 43 remain open. The number of the illustrated hollow fiber membranes 43 does not correspond to the actual number of the hollow fiber membranes 43. The hollow fiber membranes 43 are individually closed on top and flowed freely on top in the liquid 37 to be filtered besides the lower fixation. The hollow fiber membranes 43 are completely enclosed by the tube 45. The tube 45 protrudes by 10 cm above the upper ends 52 of the hollow fiber membranes 43.

Figure 5B:
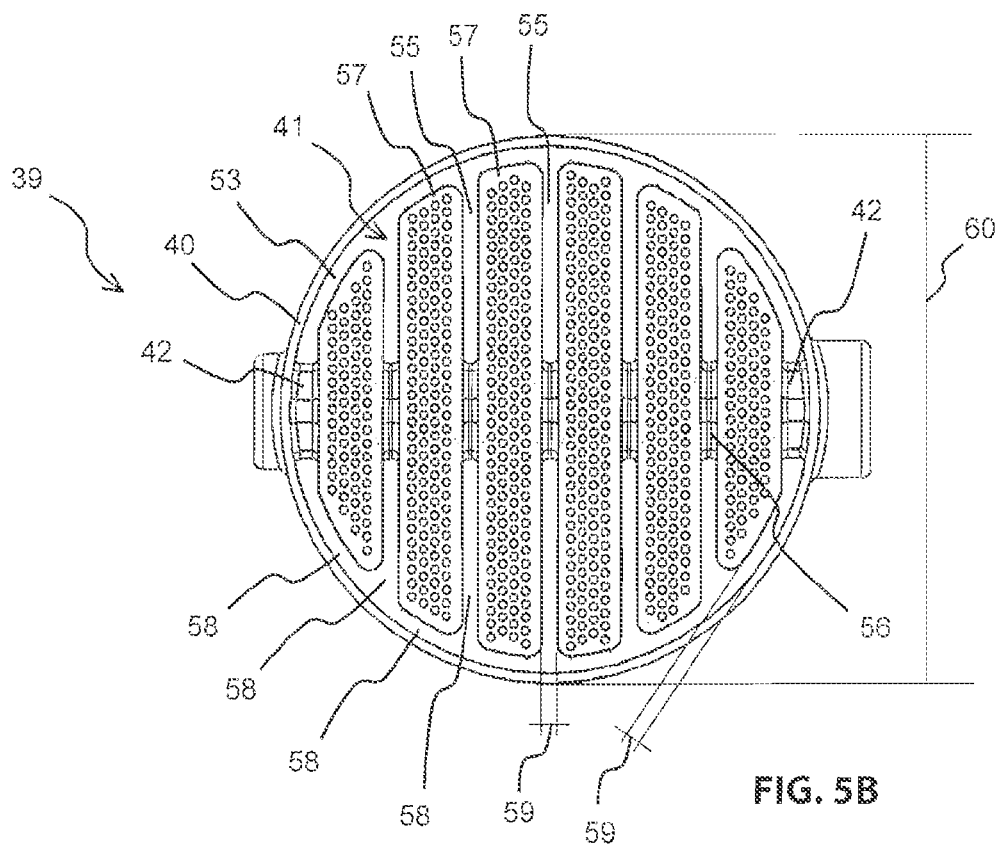
Figure 5C:
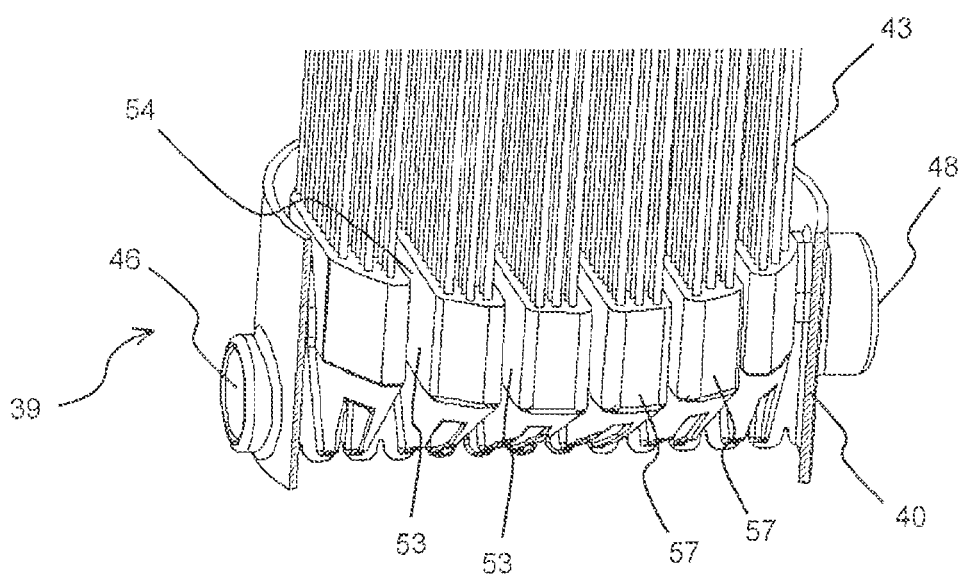

FIG. 5B illustrates a top view of the base element 39 of the second membrane filter 36 and FIG. 5C illustrates a perspective view with a cut up shell 40. Between the shell 40 and the membrane carrier 41 the base element 39 includes a downward open flow cavity 53 for flowing the liquid 37 to be filtered wherein the flow cavity includes an outlet 54 on top for letting the liquid 37 to be filtered out into the tube 45.

The flow cavity 53 has bulges 55 that protruded into the membrane carrier 41 up to an anchor 56 of the membrane carrier 41. Thus 6 fingers 57 are formed at the membrane carrier 41 wherein the 6 fingers are connected by the anchor 56 of the membrane carrier 41. The 2 anchors 42, are arranged in an extension of the anchor 56, wherein the gas inlet 46 runs through one anchor location and the permeate outlet 48 runs through the other anchor location. The two anchor locations 42 are the only connections of the membrane carrier 41 with the shell 40. Outfitting the membrane carrier 41 with the hollow fiber membranes 43 is performed in the second membrane filter 36 only in the portion of the fingers 57, wherein the portion between the fingers above the anchor 56 remains recessed for production reasons. The hollow fiber membranes 43 of the second membrane filter 36 are fabric reinforced and have an outer diameter of 2.5 mm.

In the portion of the anchor 56 there is a horizontal section in the base element 39 in which the flow cavity 53 forms two continuous flow channels 58 which have a uniform width 59 of 6 mm in the annular gap in the outer portion of the fingers 57. Also between the fingers 57 the flow channel 58 has the same width 59 of six mm. Since the edges of the fingers 57 are rounded for hydrodynamic reasons the 2 flow channels 58 have a slightly greater width than 6 mm at the edges of the fingers 57. Overall the 2 flow channels 58 have a uniform width of 6 mm on more than 80% of their length.

The flow cavity 53 in each horizontal section is adjacent to the shell 40 and also adjacent to the membrane carrier 41 and is only interrupted by the two anchor locations. The membrane carrier 41 closes the base element 39 completely besides the flow path 53, this means the base element 39 has no additional flow through channels besides the flow cavity 53 for the liquid 37 to be filtered for the gas 38.

The diameter 60 of the base element 39 of the second membrane filter 36 is approximately 208 mm.

Figure 5D:
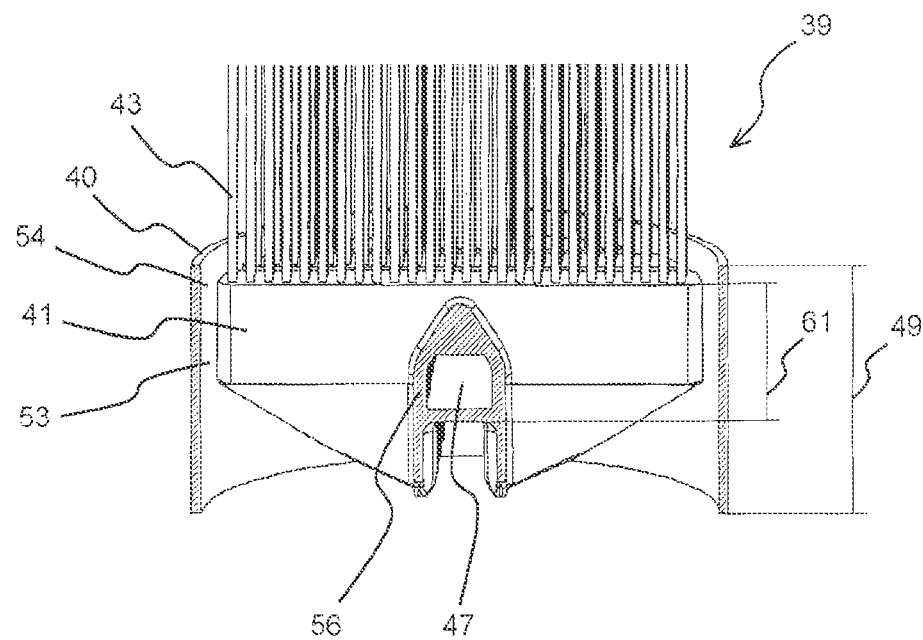

FIG. 5D illustrates a sectional view of the base element 39 of the second membrane filter 36 so that the anchor 56 is cut precisely in the flow cavity 53 between two fingers 57. Within the anchor 56 there is a portion of the permeate collecting cavity 47. The flow cavity 53 is defined in vertical direction by the overlap portion of the height 49 of the base element 39 and a height 61 of the membrane carrier 41. At the bottom side of the membrane carrier 41 a gas distribution system 62 is formed whose height remains unconsidered when defining the flow cavity 53. The flow cavity 53 terminates on top in the outlet 54.

Figure 5E:
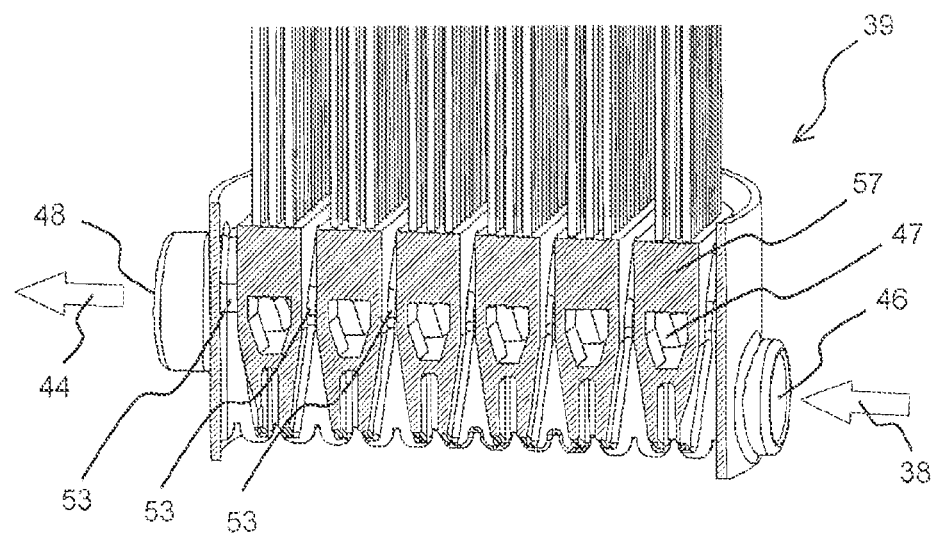

As evident from FIGS. 5D and 5e the fingers 57 are provided with a bevel on a bottom in both horizontal direction wherein the membrane carrier 41 has a horizontal cross sectional surface that decreases in the downward direction. Thus hair and fibrous compounds included in the liquid 57 to be filtered so not adhere to the fingers 57 but are stripped off along the bevel of the fingers 57 into the flow cavity 53, flushed through the flow cavity 53 and subsequently move into the portion of the hollow fiber membranes 43 in the tube 45. Since no other installations are provided in this portion besides the hollow fiber membranes 43 that are individually closed on top and at which hair or fibrous compounds can adhere and additionally since the hollow fiber membranes 43 are individually closed on top hair and fibrous compounds can be flushed freely in upward direction out of the membrane filter 36.

Figure 5F:
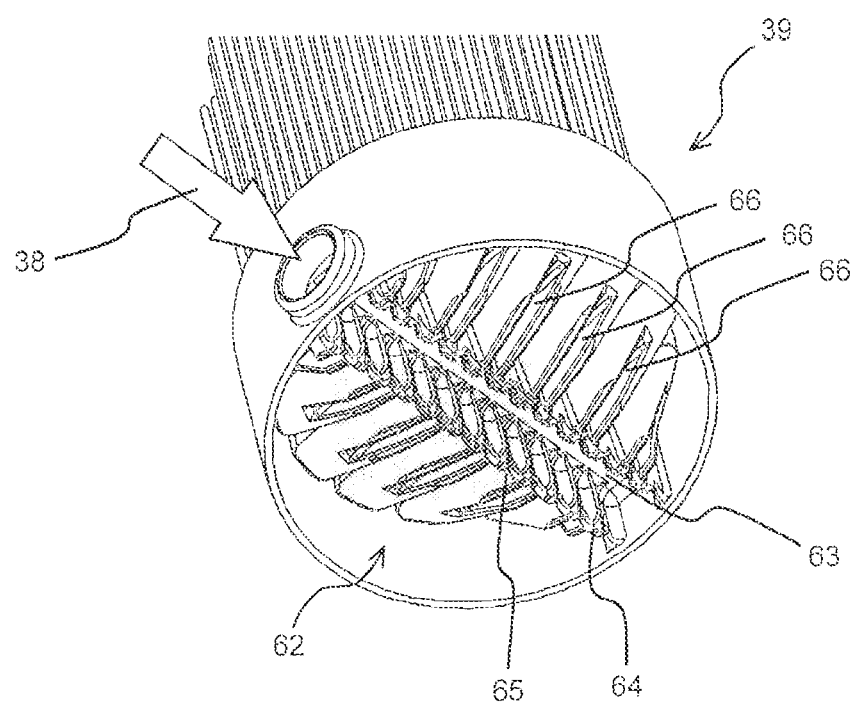
Figure 5G:
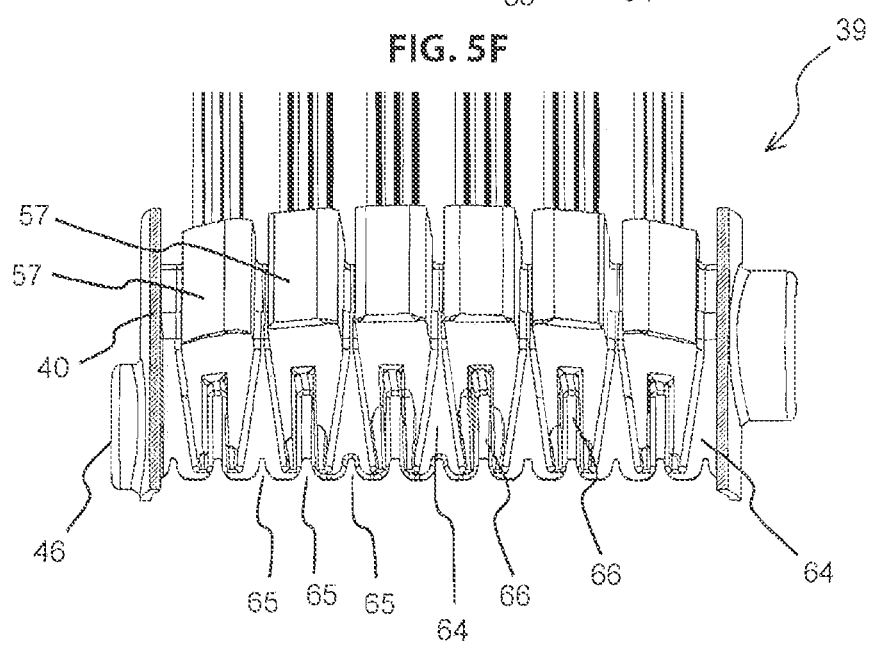

FIG. 5F illustrates a perspective view of the base element 39 of the second membrane filter 36 at a slant angle from below and FIG. 5G illustrates a half of the base element 39 with a cut up shell 40.

In the second membrane filter 36 the base element 39 includes the gas inlet 46. The gas inlet 46 is connected with a gas distribution system 62 formed at a bottom side of the membrane carrier 41 wherein the gas distribution system 62 includes a downward open and upward closed tube 63 which includes a wall 64 with downward open vertical slots 65 for distributing the gas 38 into the liquid 37 to be filtered. The width of the tub 63 corresponds to the width of the anchor 56 and is formed at its lower side. The gas inlet 46 adjoins laterally directly at the tub 63.

At each second slot 65 a gas conducting channel 66 is externally connected to the tub 63 wherein the gas conducting channel is configured at a bottom side of the finger 57 for conducting the gas 38 away from the tub in a direction towards the shell 40. The other slot 65 at which no gas conducting channel 66 are connected respectively open between two fingers 57 or for the outer fingers 57 between the fingers 57 and the shell 40 on an outside of the anchor 56. Thus the tub 63 has a wall 64 on each of its 2 longitudinal sides wherein the wall 64 respectively includes 13 slots 65. The slot 65 become wider in downward direction in order to also be able to compensate larger variations in the amount of gas that is being supplied.

The width of the slots 65 and thus also their cross sectional surface have different sizes. Thus the volume of the gas 38 is adapted to the surface of the hollow fiber membranes 43 flowing through the slots 65. Accordingly the slots 65 include wider slots 65 below the longer fingers 67 in a center of the base element 39 then the outer slots 65 below the shorter fingers 57. The narrowest slots 65 are the slots that open between the fingers 57. Through the configuration of the gas distribution system 62 with slot 65 and gas conduction channels 66 the gas 38 flows around the membrane carrier 41 after flowing in the liquid 37 to be filtered.

The base element 39 is flowable from the gas inlet 46 through the wall 63 through the slots 65 and through the flow cavity 53 to the outlet 54. The membrane carrier 41 closes the base element 39 besides the flow cavity 53 not only for the flow through of the liquid 37 to be filtered but also for the flow through of the gas 38.

Figure 5H:
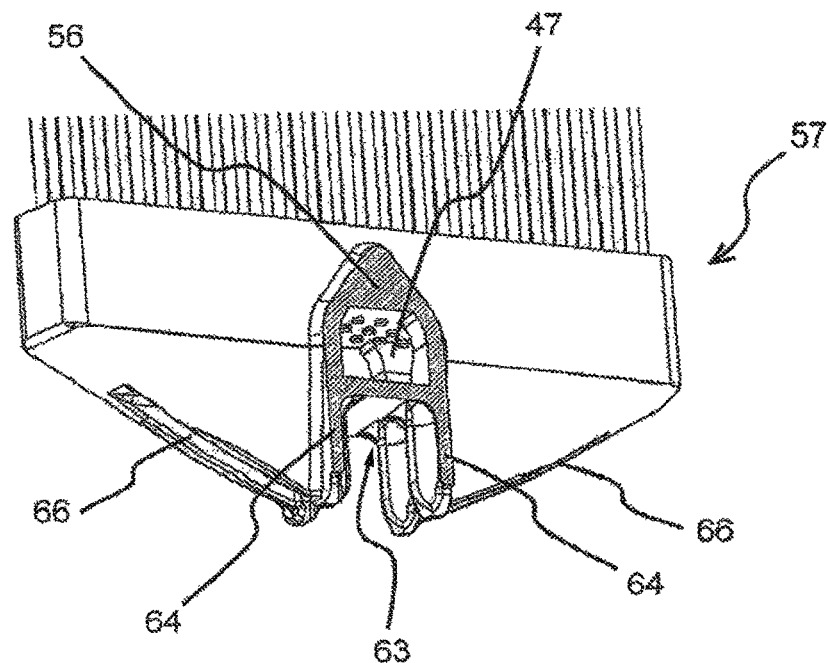

FIG. 5H illustrates only one of the fingers 57 of the second membrane filter 36. Thus the anchor 56 is visible in a sectional view as well as the tub 63 formed on its bottom side. Furthermore gas conducting channels 66 are visible on a bottom side of the finger 57, wherein the gas conducting channels 66 extend on both sides of the tub 63.

Figure 5I:
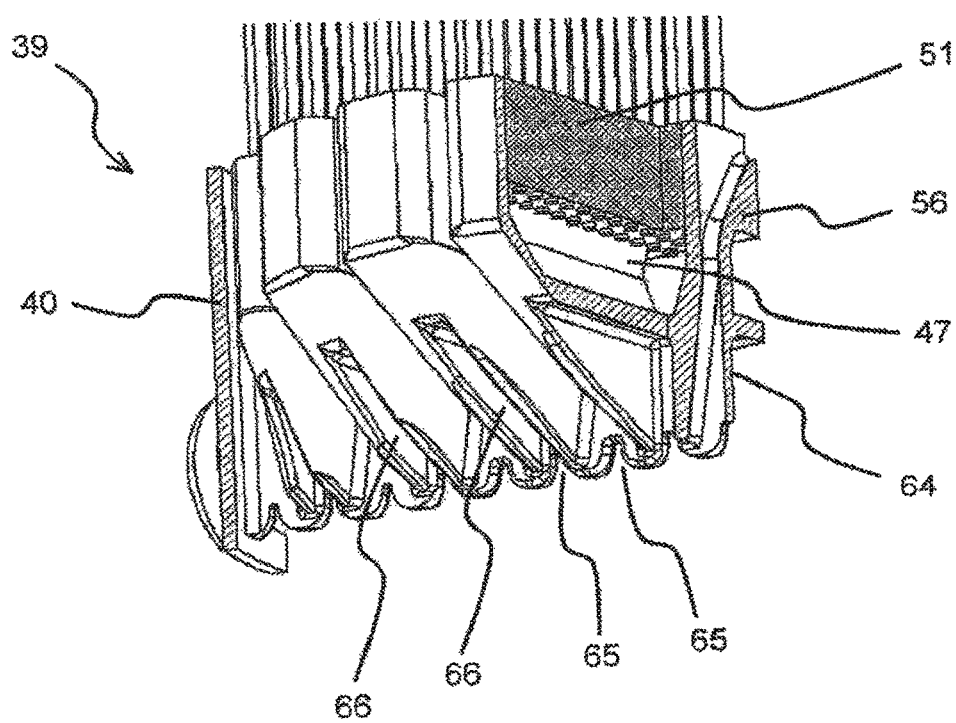

FIG. 5I shows a sectional view of the gas conducting channel 66 in the base element 39 of the second membrane filter 36. Thus it is evident that the gas conducting channel 66 adjoin the slots 65 vertically offset in upward direction.

Figure 6A:
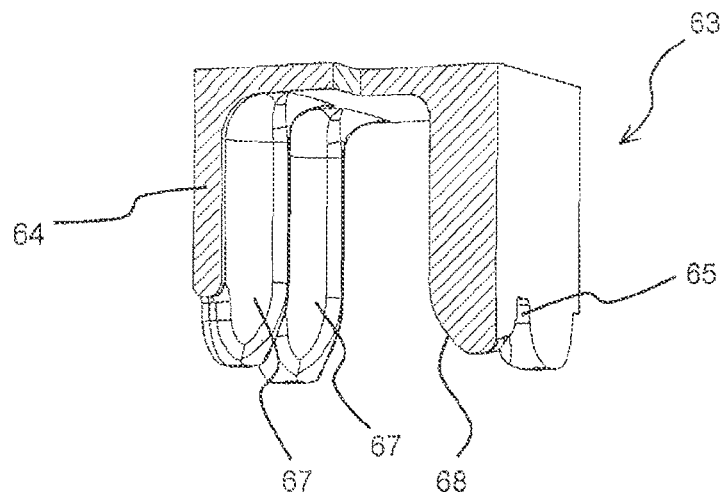
FIGS. 6A-6C illustrate partial views and sectional views of the gas distribution system of the second membrane filter.
Figure 6B:
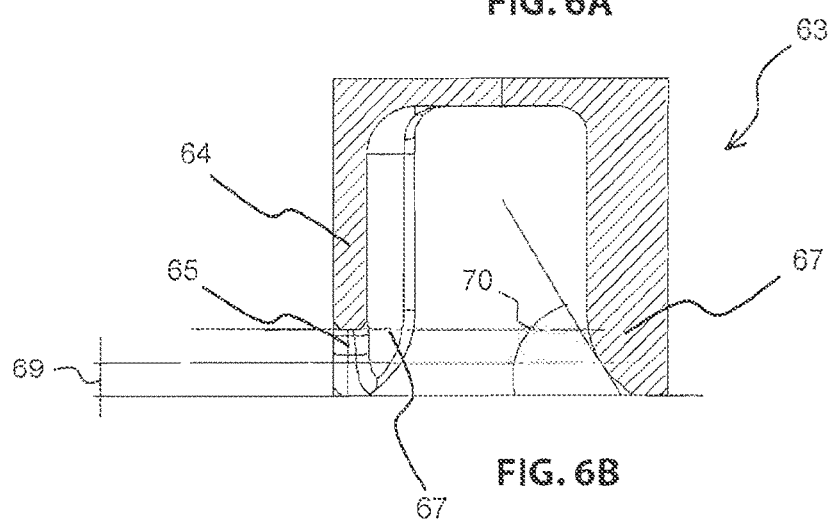
Figure 6C:
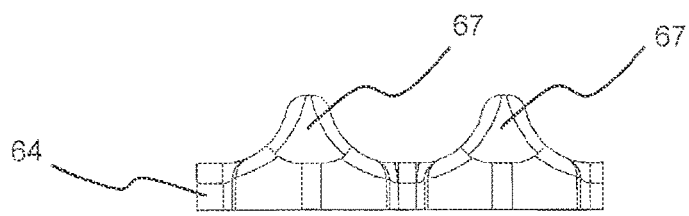

FIGS. 6A-6C illustrate views and sectional views of elements of the tub 63 of the second membrane filter 36.

The tub 63 includes vertical ribs 67 respectively extending in a center between adjacent slots 65 orthogonal to the wall 64. Each rib 67 includes a taper at a bottom which runs towards the wall 64 and thus forms a slanted or rounded inner edge 68 of the tub 63.

Geometrically speaking the tub 63 includes an inner edge 68 respectively extending between adjacent slots 65 in a vertical sectional view wherein the vertical sectional view in this case extends orthogonal to the wall 64 through the rib 67 wherein the inner edge at least in a portion of a lower half 69 of the slot 65 includes in every point an angle 70 relative to horizontal of less than 60° at a level of the half 69 of the slots 65 of 58°.

The non illustrated filtration operations of the second membrane filter 56 differs from filtrations operations of the first membrane filter 1 as follows.

The gas 38 flows through the gas inlet 46 into the tub 63 and fills the tub 63 and the slots 65 up to a portion of the height of the slot 65 with a gas cushion. From the gas cushion the gas 38 flows through the slot 65 in laterally outward direction from the tub 63 and thus at plural locations below the membrane carrier 41 into the liquid 37 to be filtered. Thus the gas 38 flows out of the slot 65 into bulges 55 of the flow cavity 53 respectively between two fingers 57 and on the other hand side out of the slot 65 below the finger 57 into the gas conduction channel 66. Through the gas conduction channel 66 the gas 38 flows in outward direction further away from the tub 63 into the outer portion of the membrane filter 36.

During lateral flow through the slots 65 a liquid flow that is oriented parallel to the lateral gas flow is generated at the face boundary below the gas cushion wherein the liquid flow flows against the inner edge 68 of the rib 67. Based on the angle 70 of the inner edge 68 of the tub 63 which is arranged between two slots 65 hair and fibrous compounds can be stripped off when the inner edge 68 is exposed to a flow which significantly reduces a clogging propensity of the membrane filter 36.

After the gas enters the liquid 37 to be filtered the membrane carrier 41 is flowed by the gas 38 and the liquid 37 before the mix from gas 38 and liquid 37 flows around the hollow fibers membranes 43 attached at a top in the membrane carrier 41. Due to the high shear force of the two phase flow the hollow fiber membranes and the membrane carrier 41 are flushed on an outside.

The base element 39 is flowed by the gas 38 starting from the gas inlet 46 through the tub 63 through the slot 65 and through the flow cavity 53 to the outlet 54. Since the flow cavity 53 is always arranged between the shell 40 and the membrane carrier 41 and furthermore protrudes through the bulges 55 also into the inner portion of the membrane filter 36 this generates even gassing of the membrane filter 36 over the entire cross section while avoiding a flow through of small parallel connected flow cavities. Thus over all the blocking propensity of the membrane filter 36 is reduced compared to what is known in the art.

Also the second membrane filter 36 can be set up for submerged operations or dry operations.

FIG. 7A-7D illustrate additional variants of membrane filters according to the invention with a base element and a head element.

Figures 7A, 7B:
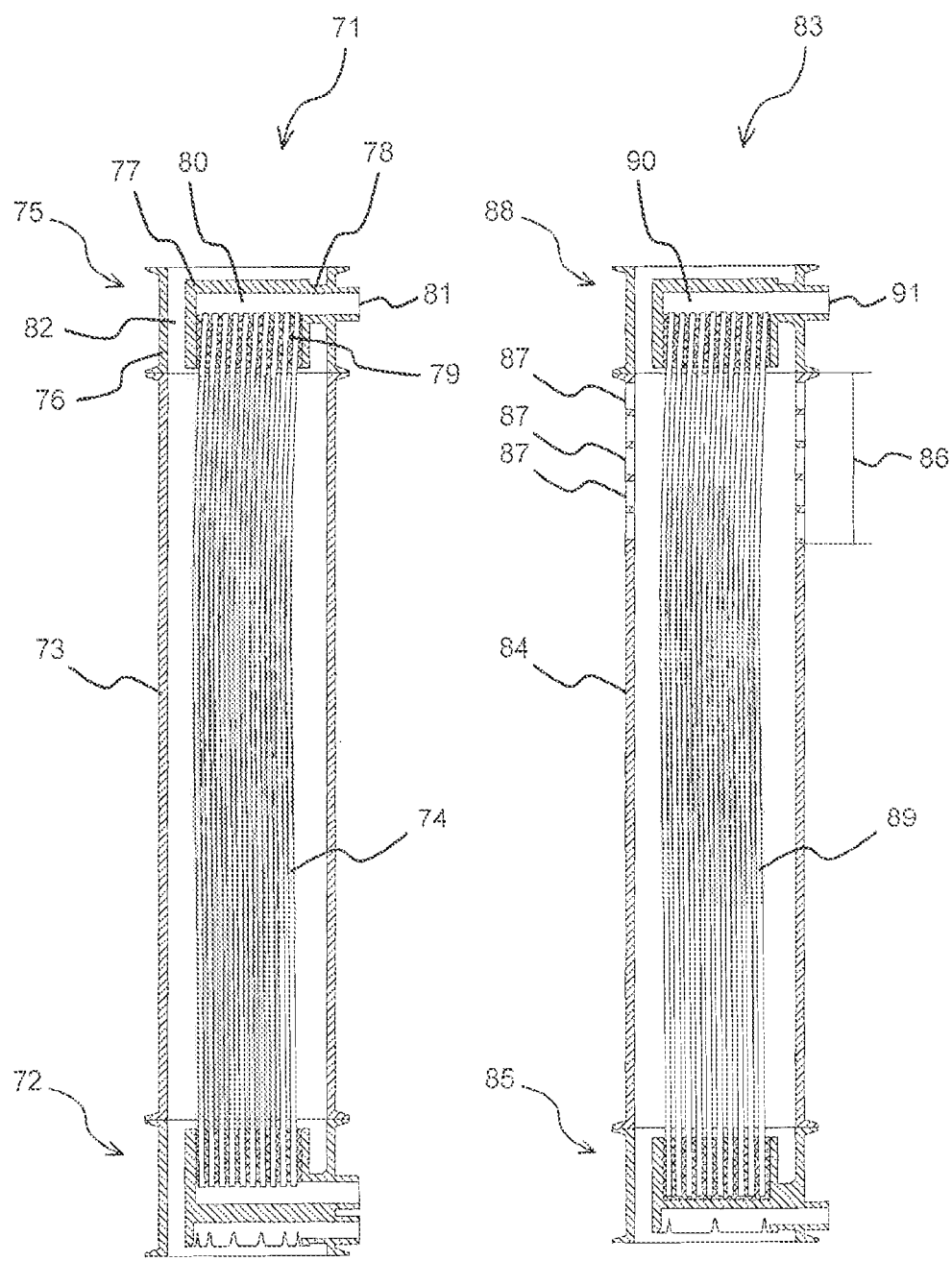
FIGS. 7A-7D illustrate additional membrane filters according to the invention.

FIG. 7A illustrates a third membrane filter 71 according to the invention. This membrane filter differs from a first membrane filter 1 in that a base element 72 is adjoined on top by a closed tube 73 which envelops the hollow fiber membrane 74 and which adjoins at a head element (75) on top. The head element 75 includes a shell 76 and a membrane carrier 77, included therein wherein the membrane carrier 77 is connected with the shell 76 only through an anchor location 78. In the head element 75 the hollow fiber membrane 74 are encased and attached on top by a resin layer 79 in a sealing manner relative to the liquid to be filtered with their lumens in an open manner.

The head element 75 includes a permeate collecting cavity 80 which is flow connected with the lumens of the hollow fiber membranes 74 for collecting the permeate and a permeate outlet 81 for draining the permeate. Furthermore the head element 75 includes a second flow cavity 82 for flowing the gas and the liquid to be filtered and flowing out of the head element 75. The third membrane filter 71 can be used in submerged operations and in dry set up operations.

FIG. 7B illustrates a fourth membrane filter 83 according to the invention. The fourth membrane filter differs from the third membrane filter 71 in that a tube 84 which adjoins at a base element 85 on top is adjoined on top initially by a tube insert 86 with openings 87 for lateral outflowing of a portion of the gas and of the liquid to be filtered from the tube 84. The tube insert 86 and the tube 84 are made for the fourth membrane filter 83 form one piece. A head element 88 adjoins on top to the tube insert 86 wherein the head element 88 has the same details as the head element 75 of the third membrane filter 71. The base element 85 forms another difference to the third membrane filter 71 wherein the base element 85 does not have any permeate collecting cavity, this means the hollow fiber membranes 39 are closed at a bottom and encased with resin in the base element 85 and fixated. The permeate generated in the hollow fiber membranes 39 only flows into the permeate collecting cavity 90 of the head element 88, is collected therein and flows through a permeate outlet 91 from the fourth membrane filter 83. This fourth membrane filter 83 can only be used in submerged operations due to the openings 87 in the tubular insert 86.

Figure 7C:
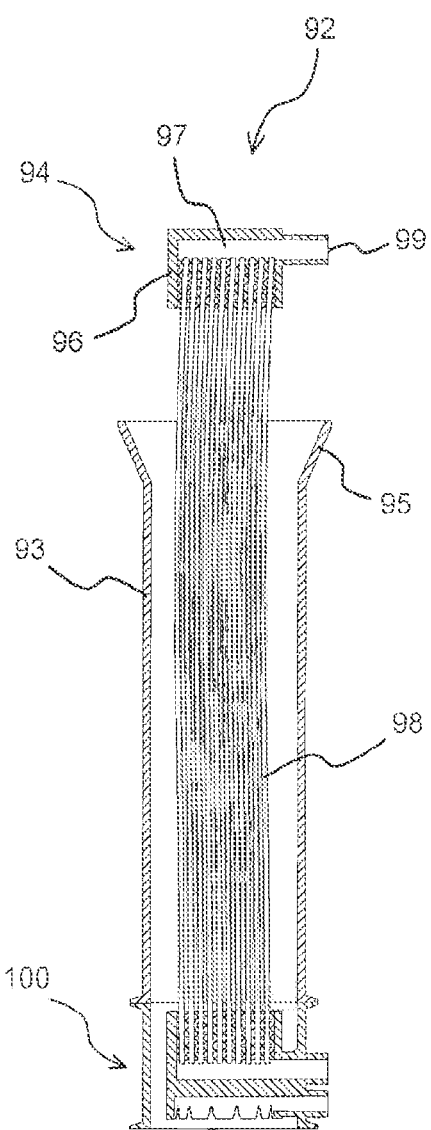

FIG. 7C illustrates a fifth membrane filter 92 according to the invention. The fifth membrane filter differs from the third membrane filter 71 in that the tube 93 is not run to the head element 94 but terminates even earlier with a tubular expansion 95 on top. Thus the head element 93 is not connected with the tube 93 and is accordingly not configured flowable for the liquid to be filtered and the gas. Therefore it only includes one membrane carrier 96 with hollow fiber membranes 98 that are resin connected and open towards a permeate collecting cavity 97 and a permeate outlet 99 adjoining the permeate collecting cavity 97 for collecting and draining a portion of the permeate generated from the hollow fiber membranes 98. The other portion of the permeate is drained from a base element 100 that is identical to the base element of the third membrane filter 71. Also the fifth membrane filter 92 can only be used in submerged operation due to the open configuration between the tube 93 and the head element 94.

Figure 7D:
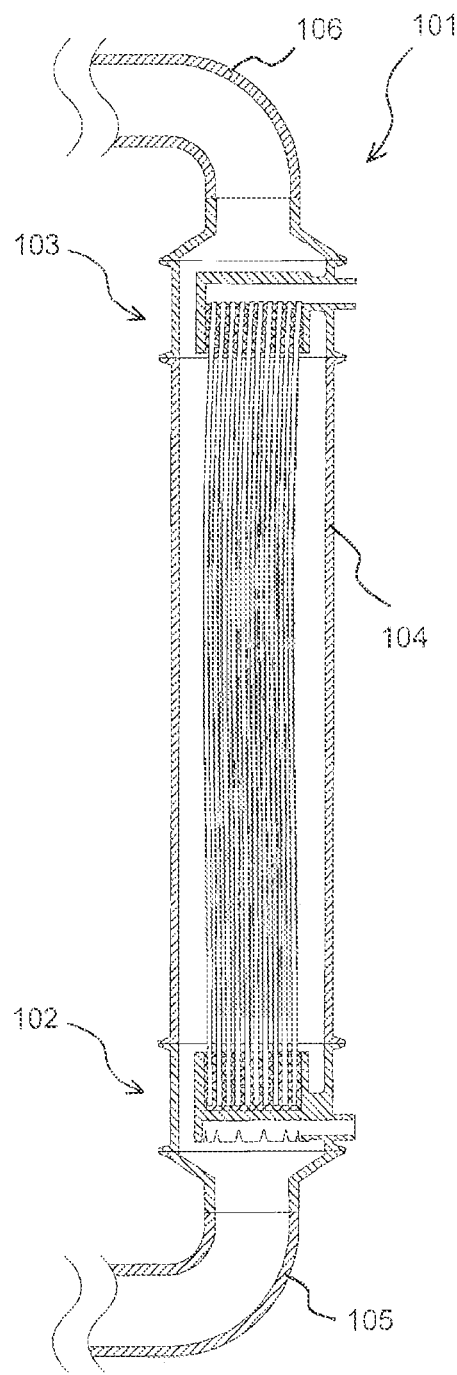

FIG. 7D illustrates a sixth membrane filter 101 according to the invention. The sixth membrane filter 101 respectively includes a base element 102 and a head element 103 which are identical to the respective elements of the fourth membrane filter 83 and which are connected through a continuously closed tube 104. The sixth membrane filter 101 according to the invention is configured for dry operations. Thus a first liquid conduit 105 is connected to the base element 102 for letting the liquid to be filtered flow from below into the base element 102. Furthermore a second liquid conduit 106 adjoins the head element 103 for letting out the liquid and the gas from the sixth membrane filter 101.

Figure 8A:
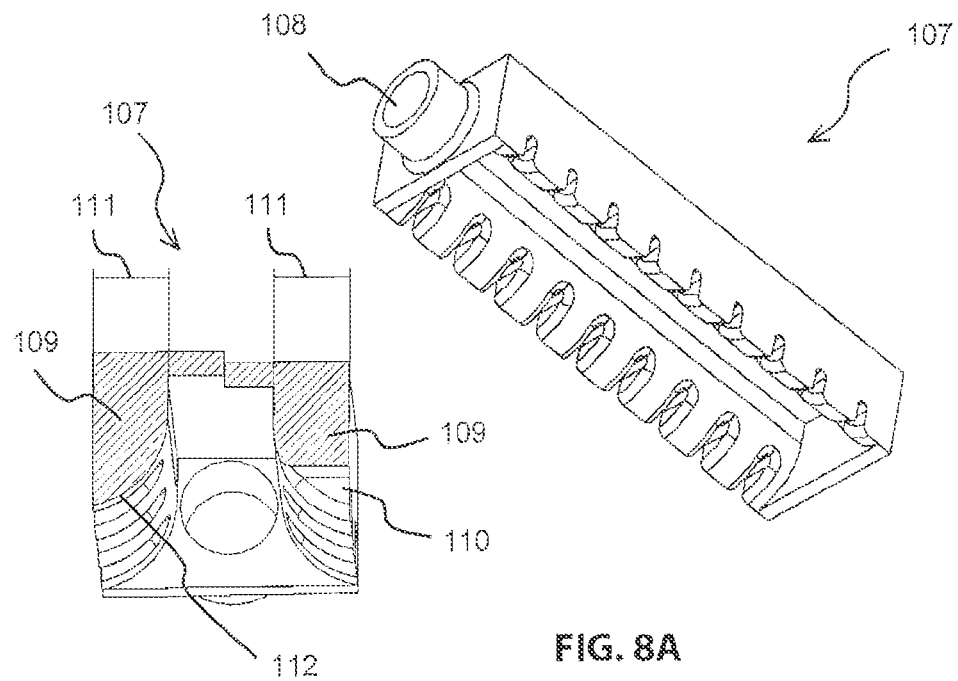
FIG. 8A illustrates a view and a sectional view of a tub of a seventh membrane filters according to the invention.
Figure 8B:
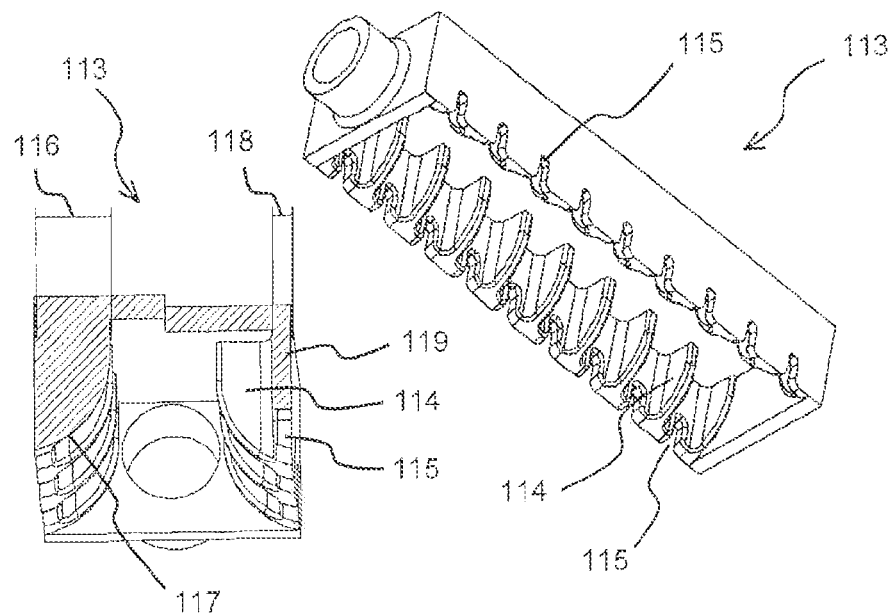
FIG. 8B illustrates a view and a sectional view of a tub of an eighth membrane filter according to the invention.

FIGS. 8A and 8B illustrate separate tubs 2 additional membrane filters according to the invention.

FIG. 8A illustrates a tub 107 of a seventh membrane filter according to the invention which is otherwise not further illustrated and includes a gas inlet 108 which laterally joins the tub 107 for flowing a gas into the tub 107. The tube 107 includes a wall 109 vertical slots 110 for flowing the gas out of the tub 107. FIG. 8A furthermore illustrates a sectional view through the tub 107 which sectional view is arranged on the left side centrally between 2 slots 110 and on the right side exactly through one of the slots 110. The wall 109 in the portion of the slots 110 and also in the portion between 2 slots 110 has a uniform thickness 111 of 15 mm on top. In the vertical sectional view of the tub 107 illustrated on the left side between 2 slots 110 the tub includes an inner edge 112 which includes an angle relative to horizontal of less than 60° in any point in the portion in the lower half of the slots 110 for stripping hair and fibrous compounds included in the liquid to be filtered.

FIG. 8B illustrates a tub 113 of an eighth membrane filter according to the invention which differs from the tub 107 only in that only ribs 114 are left over from the thick wall 109 of the tub 107. The ribs 114 are respectively centrally arranged between adjacent slots 115 and have an extension 116 into the tub 113 which decreases in downward direction. The extension 116 of the ribs 114 corresponds to the thickness 111 of the wall 109 of the tub 107 of the seventh membrane filter. In the illustrated sectional view through the rib 114 the rib 114 and thus also the tub 113 have an inner edge 117 which in each point of a lower half of the slots 115 have an angle relative to horizontal that is less than 60 degrees for stripping hair and fibrous compounds included in the liquid to be filtered, thus the rib 114 in the eighth embodiment of the membrane filter according to the invention performs the function of the thick wall 109 of the seventh membrane filter according to the invention. The thickness 118 of the wall 119 of the eighth membrane filter according to the invention is thus significantly reduced which avoids material accumulations that are disadvantageous for configuring the tub 113 as an injected molded component.

In alternative embodiment of the eighth embodiment the ribs of the opposite sides of the tub can also be arranged offset relative to one another so that also narrower tubs are implementable. This however has negative effects for longer tubs with respect to their pressure drop and thus with respect to an even longitudinal flow through of the gas.

Figure 9A:
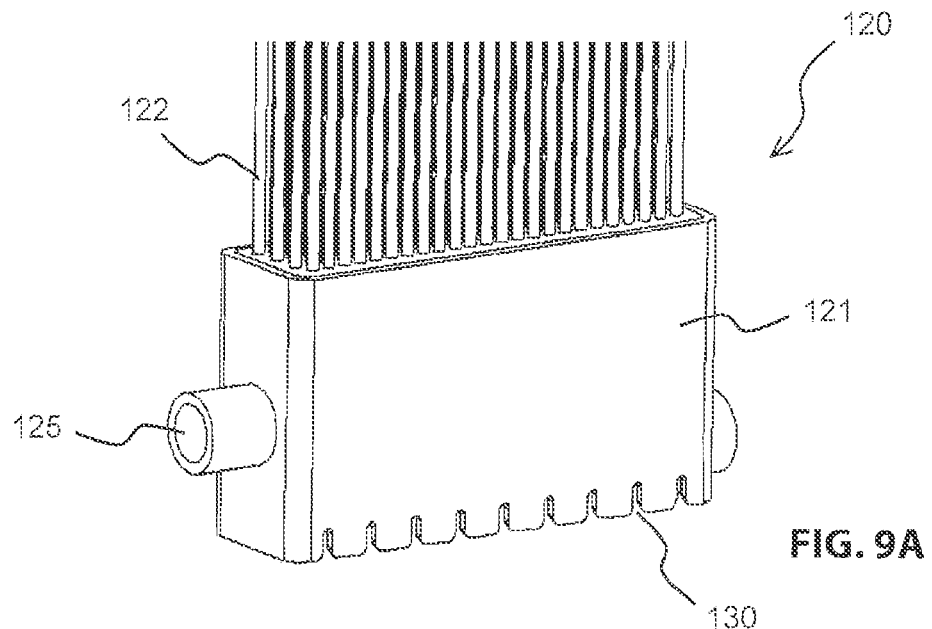
FIGS. 9A and 9B illustrate a view and a sectional view of a base element of a ninth membrane filters according to the invention.
Figure 9B:
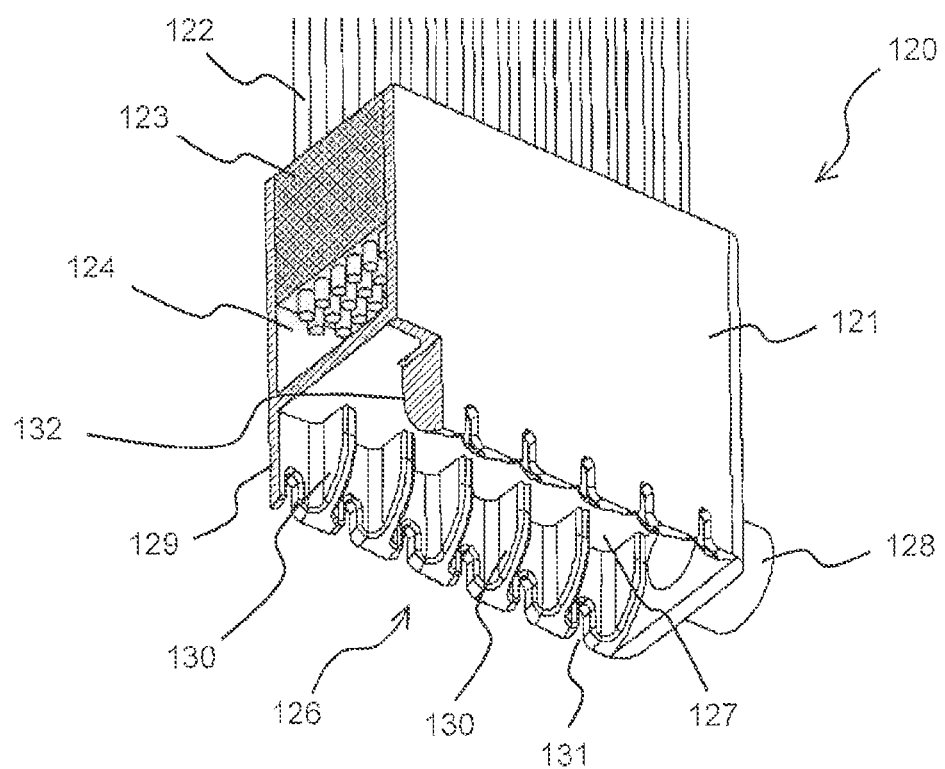

FIGS. 9A and 9B illustrate a view and a sectional view of a base element 120 of a ninth membrane filter according to the invention. This embodiment includes a rectangular membrane carrier 121 at which membranes 122 are encased and attached in a resin layer 123 which facilitate filtering a liquid permeate from a liquid to be filtered. The membrane carrier 121 furthermore includes a permeate collecting cavity 124 at which the membranes 122 are connected in an open manner at the permeate side and a permeate outlet 125 for draining the permeate from the permeate collecting cavity 124. Below the membrane carrier 121 a gas distribution system 126 is arranged which is in this case configured at a bottom side of the membrane carrier 121. Thus the membrane carrier 121 and the gas distribution system 126 are one component. The gas distribution system 126 includes a downward open tub 127 that is closed on top into which a gas inlet 128 leads on the side. The tub 127 furthermore includes a wall 129 with downward open vertical slots 130 for distributing the gas into the liquid to be filtered. The wall 129 respectively includes a vertical rib 131 between adjacent slots 130 wherein the vertical rib extends orthogonal to the wall 129 and wherein an extension of the rib into the tub 127 decreases in downward direction. Thus the rib 131 in an orthogonal sectional view relative to the wall includes an inner edge 132 of the wall which has an angle relative to horizontal of less than 60 degrees in any portion of a lower half of the slots for stripping hair and fibrous compounds included in the liquid to be filtered.

Figure 10A:
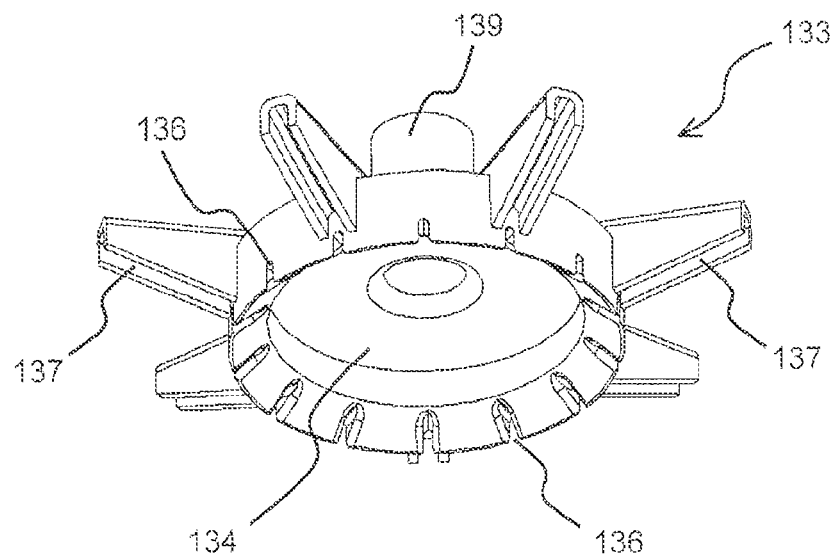
FIG. 10A-10C illustrate a view and sectional views of a gas distribution system of a tenth membrane filter according to the invention.
Figure 10B:
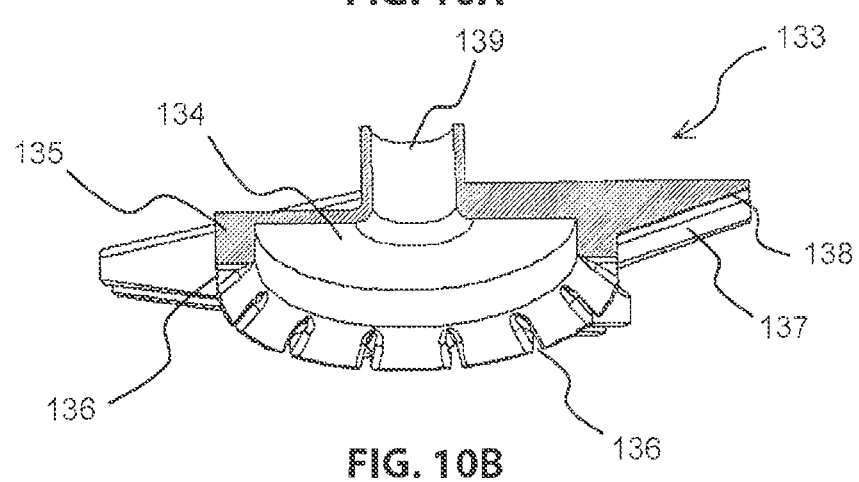
Figure 10C:
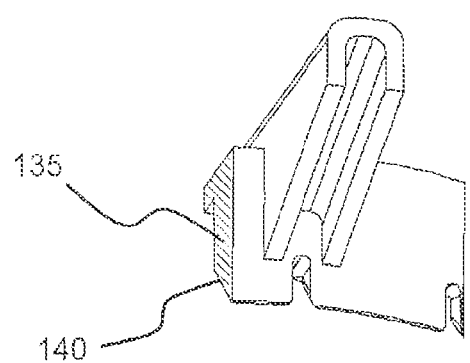

FIGS. 10A-10C illustrate a separate gas distribution system of a tenth membrane filter membrane filter according to the invention. The gas distribution system 133 includes a circular tub 134 which is open in downward direction and closed on top. The tub 134 includes a wall 135 with downward open vertical slots 136 for flowing a gas out of the tub 134. The gas distribution system 122 furthermore more includes downward open gas conducting channels 137 which adjoin each second slot 136 on an outside with a vertical upward offset. The gas conducting channels 137 include a base 139 on top which rises in upward direction starting from the connection at the tub 134. The gas distribution system 133 additionally includes a gas inlet 139 which connects to the tub 134 from above.

FIG. 10C illustrates a sectional view through the wall 135 of the tub 134. In this sectional view the tub 134 includes an inner edge 140 that is beveled at a bottom which has an angle of 40 degrees relative to horizontal in the portion of the height of the slots 136.

Figure 11A:
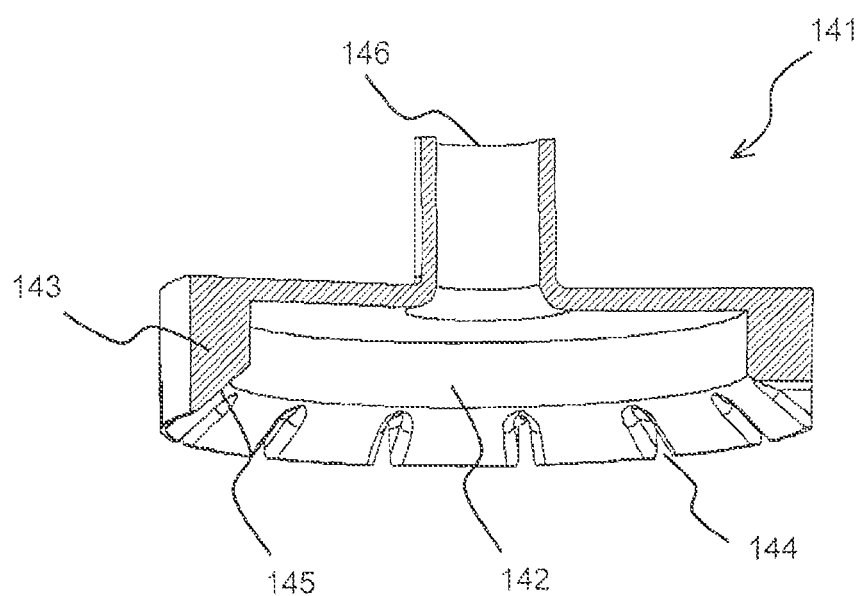
FIGS. 11A and 11B illustrates variants of a gas distribution system of additional membrane filters according to the invention.
Figure 11B:
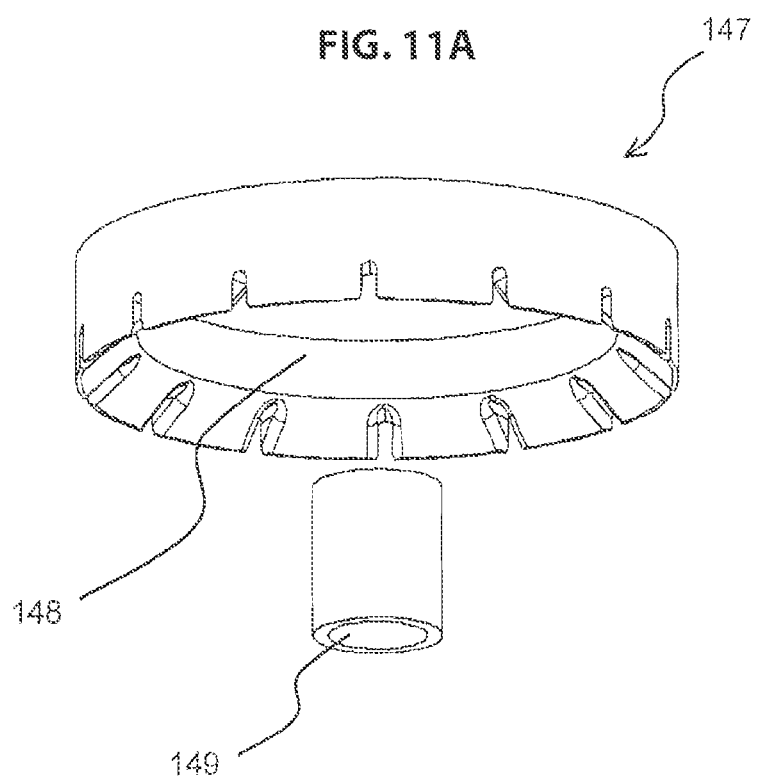

FIGS. 11A and 11B illustrate gas distribution systems of two additional membrane filters according to the invention. FIG. 11A illustrates a sectional view of a gas distribution system 141 of an eleventh membrane filter according to the invention. This gas distribution system includes a downward open circular tub 142 that is closed on top. The tub 142 includes a wall 143 with downward open vertical slots 144 for flowing a gas out of the tub 142. In a sectional view between adjacent slots 144 the tub 142 has an inner edge 145 which has an angle relative to horizontal of 40 degrees in a portion of a height of the slots 144. The gas distribution system 141 includes a gas inlet 146 which connects to the top 142 from above.

FIG. 11B illustrates a gas distribution system 147 of a twelfth membrane filter according to the invention which differs from the eleventh membrane filter only in that the gas inlet 149 is not connected with a tub 148 but arranged below the tub 148 as a tubular spout for letting a gas into the tub 148.

REFERENCE NUMERALS AND DESIGNATIONS 1 membrane filter
2 base element
3 shell
4 membrane carrier
5 hollow fiber membrane
6 tube
7 upper end
8 length
9 resin layer
10 height membrane filter
11 height base element
12 height membrane carrier
13 gas inlet
14 permeate outlet
15 anchor location
16 flow portion
17 outlet
18 gas distribution system
19 tub
20 wall
21 vertical slot
22 inner edge
23 lower half
24 angle
25 permeate collecting cavity
26 gas
27 gas cushion
28 liquid to be filtered
29 permeate
30 surface
31 gas feed conduit
32 throttle
33 permeate conduit
34 first liquid conductor
35 second liquid conductor
36 membrane filter
37 liquid to be filtered
38 gas
39 base element
40 jacket
41 membrane carrier
42 anchor location
43 hollow fiber membrane
44 permeate
45 tube
46 gas inlet
47 permeate collecting cavity
48 permeate outlet
49 height base element
50 height membrane filter
51 resin layer
52 upper end
53 flow cavity
54 outlet
55 bulge
56 anchor
57 finger 58 flow channel
59 width
60 diameter
61 height of membrane carrier
62 gas distribution system
63 tub
64 wall
65 vertical slot
66 gas conducting channel
67 rib
68 inner edge
69 lower half
70 angle
71 membrane filter
72 base element
73 shell
74 hollow fiber membrane
75 head element
76 shell
77 membrane carrier
78 anchor location
79 resin layer
80 permeate collecting cavity
81 permeate outlet
82 flow cavity
83 membrane filter
84 tube
85 base element
86 tube insert
87 opening
88 head element
89 hollow fiber membrane
90 permeate collecting cavity
91 permeate outlet
92 membrane filter
93 tube
94 head element
95 tube expansion
96 membrane carrier
97 permeate collecting cavity
98 hollow fiber membrane
99 permeate outlet
100 base element
101 membrane filter
102 base element
103 head element
104 tube
105 first liquid conductor
106 second liquid conductor
107 tub
108 gas inlet
109 wall
110 slot
111 thickness
112 inner edge
113 tub
114 rib
115 slot
116 extension
117 inner edge
118 thickness
119 wall
120 base element
121 membrane carrier
122 membrane
123 resin layer
124 permeate collecting cavity
125 permeate outlet
126 gas distribution system
127 tub
128 gas inlet
129 wall
130 slot
131 rib
132 inner edge
133 gas distribution system
134 tub
135 wall
136 slot
137 gas conducing channel
138 base
139 gas inlet
140 inner edge
141 gas distribution system
142 tub
143 wall
144 slot
145 inner edge
146 gas inlet
147 gas distribution system
148 tub
149 gas inlet

What is claimed is:

1. A membrane filter for filtering a liquid, the membrane filter comprising:
at least one membrane carrier at which membranes are attached which are configured to filter a liquid permeate from the liquid wherein the at least one membrane carrier includes a permeate collecting cavity to which the membranes are connected with an open permeate side of the membranes;
a permeate outlet for letting the permeate out from the permeate collecting cavity;
a gas distribution system arranged below the at least one membrane carrier and including
at least one downward open and upward closed tub which includes a wall with downward open vertical slots for distributing a gas into the liquid, and
at least one gas inlet into the gas distribution system,
wherein the at least one downward open and upward closed tub includes an inner edge that is arranged between two of the downward open vertical slots that are adjacent to each other in at least one vertical cross section of the at least one downward open and upward closed tub, and
wherein each section of the inner edge is oriented at an angle of less than 60° relative to horizontal at least in a portion of a lower half of the downward open vertical slots.

2. The membrane filter according to claim 1, wherein the gas distribution system is arranged at a bottom side of the at least one membrane carrier.

3. The membrane filter according to claim 1,
wherein the at least one downward open and upward closed tub includes at least one vertical rib which extends from the wall with the downward open vertical slots in an inward direction of the membrane filter and which is arranged between the two of the downward open vertical slots that are adjacent to each other, and
wherein an extension of the at least one vertical rib into the at least one tub decreases in a downward direction.

4. The membrane filter according to claim 1,
wherein the gas distribution system includes downward open gas distribution channels which adjoin at least a portion of the downward open vertical slots on an outside for forwarding and distributing the gas away from the at least one downward open and upward closed tub.

5. The membrane filter according to claim 4, wherein the gas distribution channels adjoin the downward open vertical slots with a vertical upward offset.

6. The membrane filter according to claim 1, wherein the downward open vertical slots become wider in a downward direction.

7. The membrane filter according to claim I, wherein the downward open vertical slots have cross sectional surfaces with different sizes.

8. The membrane filter according to claim 1, wherein the at least one gas inlet laterally adjoins the at least one downward open and upward closed tub.

9. A method for filtering a liquid in a membrane filter including
at least one membrane carrier each having membranes,
at least one gas inlet, and
a gas distribution system with at least one downward open and upward closed tub which includes a wall with downward open slots,
the method comprising the steps:
flowing a gas through the at least one gas inlet into the at least one downward open and upward closed tub;
filling the at least one downward open and upward closed tub and the downward open slots up to a portion of a height of the downward open slots with a gas cushion formed by the gas;
flowing the gas out of the gas cushion through the downward open slots in a laterally outward direction from the at least one downward open and upward closed tub and thus flowing the gas into the liquid at several locations below the at least one membrane carrier;
generating a liquid flow caused by the gas at a phase boundary below the gas cushion during a lateral flow of the gas through the downward open slots wherein the liquid flow is parallel to the lateral flow of the gas,
generating a rising gas flow in the membrane filter which generates a rising liquid flow in the membrane filter, and
flushing the at least one membrane carrier and the membranes attached thereon with the rising liquid flow and the rising gas flow,
filtering the liquid through the membranes; and
collecting the liquid permeate from the membranes and flowing the liquid permeate out of the membranes;
wherein the liquid flow that is generated below the gas cushion flows against an inner edge of the at least one downward open and upward closed tub between adjacent downward open slots in at least one vertical cross section of the at least one downward open and upward closed tub, which cross section is orthogonal to the wall with the downward open slots,
wherein the inner edge is oriented at an angle relative to horizontal of less than 60° at least in a portion of a lower half of the downward open slots.

10. The method according to claim 9, wherein the gas after flowing through some of the downward open slots flows through the gas distribution channels into portions of the membrane filter which are further remote in outward direction than the at least one downward open upward closed tub.

11. The method according to claim 9,
wherein the gas distribution system is configured at a bottom side of the at least one membrane carrier, and
wherein the gas flows around the at least one membrane carrier after flowing into the liquid.

* * * * *